US008861356B2

(12) United States Patent
Kozat et al.

(10) Patent No.: US 8,861,356 B2
(45) Date of Patent: Oct. 14, 2014

(54) METHOD AND APPARATUS FOR PRIORITIZED INFORMATION DELIVERY WITH NETWORK CODING OVER TIME-VARYING NETWORK TOPOLOGIES

(75) Inventors: Ulas C. Kozat, Santa Clara, CA (US); Christine Pépin, Mountain View, CA (US); Haralabos Papadopoulos, San Jose, CA (US); Sean A. Ramprashad, Los Altos, CA (US); Carl-Erik W. Sundberg, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 342 days.

(21) Appl. No.: 12/040,653

(22) Filed: Feb. 29, 2008

(65) Prior Publication Data

US 2008/0225751 A1 Sep. 18, 2008

Related U.S. Application Data

(60) Provisional application No. 60/906,999, filed on Mar. 13, 2007.

(51) Int. Cl.
*H04L 12/801* (2013.01)
*H04L 12/851* (2013.01)

(Continued)

(52) U.S. Cl.
CPC ........... *H04W 40/12* (2013.01); *H04L 41/5054* (2013.01); *H04L 45/30* (2013.01);

(Continued)

(58) Field of Classification Search
USPC .............. 370/395.21, 254, 255; 709/238, 240
See application file for complete search history.

(56) References Cited

U.S. PATENT DOCUMENTS 5,903,842 A 5/1999 Wang et al.
5,982,327 A 11/1999 Vook et al.

(Continued)

FOREIGN PATENT DOCUMENTS

EP 1162750 A2 12/2001
EP 1383246 A2 1/2004

(Continued)

OTHER PUBLICATIONS

PCT International Search Report dated Sep. 18, 2008, for PCT/US08/006286, filed May 16, 2008, 4 pages.

(Continued)

*Primary Examiner* — Ayaz Sheikh
*Assistant Examiner* — Tarell Hampton
(74) *Attorney, Agent, or Firm* — Blakely, Sokoloff, Taylor & Zafman LLP

(57) ABSTRACT

A method and apparatus is disclosed herein for information delivery with network coding over time-varying network topologies. In one embodiment, the method comprises decomposing a sequence of topology graphs that model a time-varying network topology into a plurality of virtual graphs, where each virtual graph of the plurality of virtual graphs corresponds to a distinct traffic class, and the virtual topology graph representing a partial topology of a time-varying network. The method also includes selecting a network code for each virtual graph in the plurality of the virtual graphs to meet requirements of the distinct traffic class corresponding to said each topology graph, where the network code is used to encode packets of the associated traffic class, and processing packets of each traffic class using the network code determined by its corresponding virtual topology and the requirements of said each traffic class, including using a virtual buffer system to implement the network code corresponding to each traffic class over the physical network topology. The method also includes using a scheduler to determine the transmission schedules for each output packet from the virtual buffer system of each traffic class where the scheduling decisions are based, at least in part, on the QoS requirements of each class.

35 Claims, 12 Drawing Sheets

(51) Int. Cl.

| | |
|---|---|
| ***H04L 12/725*** | (2013.01) |
| ***H04L 12/18*** | (2006.01) |
| ***H04W 40/12*** | (2009.01) |
| ***H04L 12/811*** | (2013.01) |
| ***H04L 12/721*** | (2013.01) |
| ***H04L 12/761*** | (2013.01) |
| ***H04L 12/863*** | (2013.01) |
| ***H04L 12/803*** | (2013.01) |
| *H04L 12/24* | (2006.01) |

(52) U.S. Cl.

CPC .......... *H04L 47/10* (2013.01); *H04L 12/1881* (2013.01); *H04L 41/12* (2013.01); *H04L 47/38* (2013.01); *H04L 47/24* (2013.01); *H04L 45/38* (2013.01); *H04L 47/2408* (2013.01); *H04L 47/2441* (2013.01); *H04L 45/16* (2013.01); *H04L 47/15* (2013.01); *H04L 47/6215* (2013.01); *H04L 45/14* (2013.01); *H04L 41/5003* (2013.01); *H04L 47/125* (2013.01)

USPC ........... 370/235; 370/229; 370/231; 709/232; 709/233

(56) References Cited

U.S. PATENT DOCUMENTS

| | | | | |
|---|---|---|---|---|
| 6,182,264 | B1 | 1/2001 | Ott | |
| 6,629,287 | B1 | 9/2003 | Brink | |
| 6,804,307 | B1 | 10/2004 | Popović | |
| 6,862,552 | B2 | 3/2005 | Goldstein et al. | |
| 6,901,117 | B1 | 5/2005 | Classon et al. | |
| 6,976,087 | B1 * | 12/2005 | Westfall et al. | 709/238 |
| 7,042,856 | B2 | 5/2006 | Walton et al. | |
| 7,042,858 | B1 | 5/2006 | Ma et al. | |
| 7,072,295 | B1 | 7/2006 | Benson et al. | |
| 7,095,812 | B2 | 8/2006 | Chan | |
| 7,251,369 | B2 | 7/2007 | Nakaya | |
| 7,308,047 | B2 | 12/2007 | Sadowsky | |
| 7,310,369 | B1 | 12/2007 | Krieger et al. | |
| 7,436,895 | B1 | 10/2008 | Tujkovic | |
| 7,441,045 | B2 | 10/2008 | Skene et al. | |
| 7,446,925 | B2 | 11/2008 | Bloom | |
| 7,564,915 | B2 | 7/2009 | Lee et al. | |
| 7,620,117 | B2 | 11/2009 | Chae et al. | |
| 7,848,439 | B2 | 12/2010 | She et al. | |
| 7,877,097 | B2 | 1/2011 | Zhu et al. | |
| 7,877,108 | B2 | 1/2011 | Wengerter et al. | |
| 7,924,775 | B2 | 4/2011 | Khan et al. | |
| 8,027,407 | B2 | 9/2011 | Papadopoulos | |
| 8,042,031 | B2 | 10/2011 | Chen et al. | |
| 2002/0114404 | A1 | 8/2002 | Aizawa et al. | |
| 2002/0118781 | A1 | 8/2002 | Thomas et al. | |
| 2002/0176431 | A1 * | 11/2002 | Golla et al. | 370/412 |
| 2003/0002505 | A1 * | 1/2003 | Hoch et al. | 370/392 |
| 2003/0003863 | A1 | 1/2003 | Thielecke et al. | |
| 2003/0072254 | A1 | 4/2003 | Ma et al. | |
| 2003/0235149 | A1 | 12/2003 | Chan et al. | |
| 2003/0236080 | A1 | 12/2003 | Kadous et al. | |
| 2004/0013180 | A1 | 1/2004 | Giannakis et al. | |
| 2004/0022179 | A1 | 2/2004 | Giannakis et al. | |
| 2004/0042400 | A1 * | 3/2004 | Horlin et al. | 370/232 |
| 2004/0116146 | A1 | 6/2004 | Sadowsky et al. | |
| 2004/0165675 | A1 | 8/2004 | Ito et al. | |
| 2004/0205445 | A1 | 10/2004 | Xu | |
| 2005/0010675 | A1 | 1/2005 | Jaggi et al. | |
| 2005/0041751 | A1 | 2/2005 | Nir et al. | |
| 2005/0047514 | A1 | 3/2005 | Bolinth et al. | |
| 2005/0068918 | A1 | 3/2005 | Mantravadi et al. | |
| 2005/0111592 | A1 | 5/2005 | Yee | |
| 2005/0152391 | A1 | 7/2005 | Effros et al. | |
| 2005/0185707 | A1 | 8/2005 | Hoo et al. | |
| 2005/0220040 | A1 | 10/2005 | Petrovic et al. | |
| 2005/0265280 | A1 | 12/2005 | Roh et al. | |
| 2006/0002312 | A1 * | 1/2006 | Delattre et al. | 370/254 |
| 2006/0020560 | A1 | 1/2006 | Rodriguez et al. | |
| 2006/0023624 | A1 | 2/2006 | Han et al. | |
| 2006/0029124 | A1 | 2/2006 | Grant et al. | |
| 2006/0039489 | A1 | 2/2006 | Ikram et al. | |
| 2006/0098760 | A1 | 5/2006 | Shen et al. | |
| 2006/0146716 | A1 | 7/2006 | Lun et al. | |
| 2006/0146791 | A1 | 7/2006 | Deb et al. | |
| 2006/0148506 | A1 | 7/2006 | Hoo | |
| 2006/0152391 | A1 | 7/2006 | Sakuyama | |
| 2006/0176945 | A1 | 8/2006 | Li | |
| 2006/0276217 | A1 | 12/2006 | Khojastepour et al. | |
| 2007/0005806 | A1 | 1/2007 | Fitzgibbon et al. | |
| 2007/0041475 | A1 | 2/2007 | Koshy et al. | |
| 2007/0066229 | A1 | 3/2007 | Zhang et al. | |
| 2007/0121499 | A1 * | 5/2007 | Pal et al. | 370/230 |
| 2007/0147414 | A1 | 6/2007 | Niu et al. | |
| 2007/0156919 | A1 * | 7/2007 | Potti et al. | 709/238 |
| 2007/0198899 | A1 | 8/2007 | Yellin et al. | |
| 2007/0213013 | A1 | 9/2007 | Kim | |
| 2007/0223423 | A1 | 9/2007 | Kim et al. | |
| 2007/0281633 | A1 | 12/2007 | Papadopoulos | |
| 2007/0286313 | A1 | 12/2007 | Nikopour-Deilami et al. | |
| 2008/0025430 | A1 | 1/2008 | Sadowsky | |
| 2008/0032630 | A1 | 2/2008 | Kim et al. | |
| 2008/0075022 | A1 | 3/2008 | Lei et al. | |
| 2008/0089333 | A1 | 4/2008 | Kozat et al. | |
| 2008/0092028 | A1 | 4/2008 | Orio | |
| 2008/0101310 | A1 | 5/2008 | Marzetta | |
| 2008/0123781 | A1 | 5/2008 | Pisek et al. | |
| 2008/0181339 | A1 | 7/2008 | Chen et al. | |
| 2008/0212526 | A1 | 9/2008 | Oyman | |
| 2008/0254749 | A1 | 10/2008 | Ashkenazi et al. | |
| 2009/0082054 | A1 | 3/2009 | Li et al. | |
| 2009/0213954 | A1 | 8/2009 | Bursalioglu et al. | |
| 2009/0225878 | A1 | 9/2009 | Papadopoulos et al. | |
| 2009/0245408 | A1 | 10/2009 | Mujtaba et al. | |
| 2009/0268684 | A1 | 10/2009 | Lott et al. | |
| 2009/0285323 | A1 | 11/2009 | Sundberg et al. | |
| 2009/0291699 | A1 | 11/2009 | Heath et al. | |
| 2009/0296842 | A1 | 12/2009 | Papadopoulos et al. | |
| 2011/0128917 | A1 | 6/2011 | Ko et al. | |

FOREIGN PATENT DOCUMENTS

| | | | |
|---|---|---|---|
| EP | 1411693 | A2 | 4/2004 |
| EP | 14116936 | A2 | 4/2004 |
| EP | 1521386 | A2 | 4/2005 |
| EP | 1530387 | A1 | 5/2005 |
| EP | 1648097 | A | 4/2006 |
| EP | 1648097 | A2 | 4/2006 |
| EP | 1827040 | A1 | 8/2007 |
| EP | 1863208 | A1 | 12/2007 |
| GB | 2304495 | | 3/1997 |
| GB | 2407007 | A | 4/2005 |
| JP | 2005-535167 | | 5/2005 |
| JP | 2006-504339 | | 2/2006 |
| JP | 2009-506659 | | 2/2009 |
| KR | 1020060063478 | A | 6/2006 |
| WO | WO 01/43293 | A1 | 6/2001 |
| WO | WO 2004/045167 | A | 5/2004 |
| WO | WO 2004/025011 | A | 7/2004 |
| WO | WO 2004/056011 | A1 | 7/2004 |
| WO | WO 2005/046081 | A1 | 5/2005 |
| WO | WO 2006/029050 | A | 3/2006 |
| WO | WO 2007/050860 | A1 | 5/2007 |
| WO | WO 2007/073267 | A1 | 6/2007 |
| WO | WO 2007/087540 | A2 | 8/2007 |
| WO | WO 2007/129990 | A1 | 11/2007 |
| WO | WO 2008/057791 | A1 | 5/2008 |
| WO | WO 2008/062587 | A1 | 5/2008 |
| WO | WO 2008/093964 | A2 | 8/2008 |
| WO | WO 2008/143973 | A1 | 11/2008 |
| WO | WO 2009/033023 | A2 | 3/2009 |
| WO | WO 2010/019618 | A2 | 2/2010 |

OTHER PUBLICATIONS

Written Opinion of the International Searching Authority dated Sep. 18, 2008, for PCT/US08/006286, filed May 16, 2008, 8 pages.

(56) References Cited

OTHER PUBLICATIONS

International Search Report mailed Nov. 6, 2008 for PCT/US08/065675, filed Jun. 3, 2008, 5 pages
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
Joham, M., et al., "Linear Transmit Processing in MIMO Communications Systems", IEEE Transactions on Signal Processing, Aug. 2005, pp. 2700-2712.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Wiswanath, P., et al., "Sum Capacity of the Multiple Antenna Gaussian Broadcast Channel and Uplink-Downlink Duality", IEEE Transactions on Information Theory, Aug. 2003, pp. 1912-1923.
Marzetta, T.L., "How Much Training Is Required for Multi-User Mimo?", ACSSC96, Asilomar Conference Oct. 2006.
Medard, M., "The Effect upon Channel Capacity in Wireless Communication of Imperfect Knowledge of the Channel", IEEE Transactions on Information Theory, May 2000, pp. 935-945.
Caire, G., et al., "Achievable Throughput of MIMO Downlink Beamforming and Limited Channel Information", Proceedings of IEEE IMRC, Aug. 2007.
Stott, L.H., "The DVD Terrestrial (DVB-T) Specification and Its Implementation in a Practical Modem", Proceedings of the 1996 International Broadcasting Convention, IEEE Conference Publication No. 428, Sep. 1996, pp. 255-260.
Tse, D., et al., "Fundamentals of Wireless Communication", Cambridge University Press, May 2005.
Horn, R.A., et al., "Matrix Analysis", Cambridge University Press, New York, 1994.
Sezgin, A., et al., "On EXIT-Chart Analysis of Coherent and Non-Coherent Space-Time Codes", Smart Antennas, 2004, pp. 49-56.
El Gamal, H. et al., "Distributed Space-Time Filtering for Cooperative Wireless Networks", GLOBECOM'03, Dec. 2003, pp. 1826-1830.
Wang, H. et al.: "Upper Bounds of Rates of Space-Time Block Codes from Complex Orthogonal Designs," IEEE Trans. Information Theory, pp. 2788-2796, Oct. 2003, 9 pages.
Sharma, N. et al.: "Improved Quasi-Orthogonal Codes Through Constellation Rotation," IEEE Trans. Communications, pp. 332-335, Mar. 2003, 3 pages.
Tirkkonen, O. et al.: "Minimal Non-Orthogonality Rate 1 Space-Time Block Code for 3+ Transmit Antennas," IEEE 6th Int. Symp. Spread Spectrum Tech. And Appl., pp. 429-432, Sep. 2000, 4 pages.
Jafarkani, H., "A Quasi-Orthogonal Space-Time Block Code", IEEE Transactions on Communications, Jan. 2001, 4 pages.
Su, W., et al., "Signal Constellations for Quasi-Orthogonal Space-Time Block Codes with Full Diversity", IEEE Transactions on Information Theory, Oct. 2004, pp. 2231-2347.
Yiu, S., et al., "Distributed Block Source Coding", IEEE GLOBECOM 2005 Proceedings, Nov. 2005.
Jafarkani, H., "Space-Time Coding, Theory and Practice", Cambridge University Press, 2005.
Cormen, T.H., et al., "Introduction to Algorithms", 2nd Edition, MIT Press and McGraw-Hill, 2001, pp. 643-700.
Ernest, P.H.H., et al., "An efficient algorithm for virtual topology reconfiguration in WDM optical ring networks," Proceedings of 10th Conference on Computer Communications and Networks, Oct. 15, 2001, pp. 55-60.
Del Re, Enrico, et al., "Next-Generation Mobile Satellite Networks," IEEE Communications Magazine, vol. 40, No. 9, Sep. 1, 2002, pp. 150-159.
Koetter, R., et al., "Beyond routing: an algebraic approach to network coding," Proceedings of IEEE Infocom 2002, vol. 1, Jun. 23, 2002, pp. 122-130.
Gencata, et al., "Virtual-topology adaptation for WDM mesh networks under dynamic traffic," Proceedings of IEEE Infocom 2002, vol. 1, Jun. 23, 2002, pp. 48-56.
Lee, Inkyu, et al., "Diversity Analysis for Space-Time, Bit-Interleaved Coded Modulation Systems", Korea University, Seoul, Korea, Jan. 2007.
Papadopoulos, H., et al., "Wideband space-time coded systems with non-collocated antennas", Radio and Wireless Symposium, 2008 IEEE, Jan. 22, 2008, pp. 307-310.
Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Wong, K.K.Y., et al., "Bi-directional soft-output m-algorithm for iterative decoding", IEEE International Conference on Communications, vol. 2, Jun. 2004, pp. 792-797.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Kawai, H., et al., "Independent adaptive control of surviving symbol replica candidates at each stage based on minimum branch metric in QRM-MLD for OFCDM MIMO multiplexing", IEEE Vehicular Technology Conference, VTC2004, vol. 3, Sep. 2004, pp. 1558-1564.
Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.
Seshadri, N., et al., "List Viterbi Decoding Algorithms with Applications", IEEE Transactions on Communications, vol. 42, No. 2/3/4, Feb./Mar./Apr. 1994, pp. 313-323.
Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.
Wong, K., "The Soft-Output M-Algorithm and Its Applications", PhD Thesis, Queens University, Kingston, Canada, Aug. 2006, 263 pages.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.
Lee, Inkyu, et al., "Code Design of Space-Time Bit-Interleaved Coded Modulation Systems for Maximum Diversity", ICC, Jun. 2004, 11 pages.
Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.
Lee, Inkyu, et al., "Code Construction for Space-Time Bit-Interleaved Coded Modulation Systems", IEEE Communications Society, 2004, 5 pages.
Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.
Lee, Heunchul, et al., "A Flexible Space-Time Coding System with Unequal Error Protectin", IEEE, 2005, 5 pages.
Lee, Inkyu, et al., "Space-Time Bit-Interleaved Coded Modulation for OFDM Systems", IEEE Transactions on Signal Processing, vol. 521, No. 3, Mar. 2004, pp. 820-825.

(56) References Cited

OTHER PUBLICATIONS

Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Alamouti, Siavash M., "A Simple Transmit Diversity Technique for Wireless Communications", IEEE Journal on Select Areas in Communications, vol. 16, No. 8, Oct. 1998, pp. 1451-1458.
Chindapol, Aik, et al., "Design, Analysis, and Performance Evaluation for BICM-ID with Square QAM Constellations in Rayleigh Fading Channels", IEEE Journal on Selected Areas in communications, vol. 19. No. 5, May 2001, pp. 944-957.
Kao, Chien-Yu, "A Bi-directional SOVA with Normalization for Turbo Decoding", Jun. 2006, Tainan, Taiwan, 72 pages.
Lattice Semiconductor Corp., "Turbo Decoder", IP Data Sheet, 2003, 6 pages.
International Search Report dated Apr. 17, 2009 for PCT/US2008/076252, 5 pages.
Written Opinion of the International Searching Authority dated Apr. 17, 2008 for PCT/US2008/076252, 9 pages.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
Written Opinion of the International Searching Authority dated Apr. 30, 2009 for PCT/US2007/022189, 8 pages.
Ahlswede, R., et al., "Network Information Flow," IEEE Transactions on Information Theory, vol. 45, No. 4, IT-45(4):1204-1215, Jul. 2000, pp. 1204-1216.
Cormen, Thomas H., et al., "Introduction to Algorithms, 2$^{nd}$ Edition," MIT Press and McGraw-Hill, 2001, pp. 643-698.
Guèrin, R. And Peris, V., "Quality-of-Service in Packet Networks: Basic Mechanisms and Directions," Invited Paper, Computer Networks, vol. 31, No. 3, Feb. 1999, pp. 1-16.
Li, Shou-Yen Robert, et al., "Linear Networking Coding," IEEE Transactions on Information Theory, vol. 49, No. 2, IT-49(2):371-381, Feb. 2003, pp. 371-381.
Koetter, R. and Mèdard, M. "An Algebraic Approach to Network Coding," IEEE/ACM Transactions on Networking, vol. 11, No. 5, Oct. 2003, pp. 782-795.
Chou, Philip A., et al., "Practical Network Coding," 51$^{st}$ Allerton Conference on Communication, Control and Computing, Oct. 2003.
Ho, Tracey, et al., "The Benefits of Coding over Routing in a Randomized Setting," in the Proceedings of the International Symposium on Information Theory (ISIT), Jun. 2003, pp. 1-6.
Katti, S., et al., "XORs in the Air: Practical Wireless Network Coding," in the Proceedings of the ACM Special Interest Group on Data Communicatin (SIGCOMM), Sep. 2005, 12 pages.
Zhang, Hui, "Service Disciplines for Guaranteed Performance Service in Packet-Switching Networks," in the proceedings of the IEEE, vol. 83, No. 10, Oct. 1995, pp. 1-23.
Taddei, H., et al., "Mode Adaptive Unequal Error Protection for Transform Predictive Speech and Audio Coders," *International Conference on Acoustics, Speech and Signal Processing*, Orlando, Florida, May 2002, pp. I-165-I-168.
IEEE Computer Society,"Part 11: Wireless Medium Access Control (MAC) and Physical Layer (PHY) Specifications: Medium Access Control (MAC) Enhancements for Quality of Service (QoS)," 2005, ANS/IEEE Std. 802.11eD13.0, 1999 Edition.
Michalke, Clemens, et al., "Linear Momo Receivers Vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
PCT International Search Report for PCT/US08/003274, dated Aug. 20, 2008, 4 pages.
PCT Written Opinion of the International Searching Authority for PCT/US08/003274, dated Aug. 20, 2008, 10 pages.
Chou, P.A., et al., "Network Coding for the Internet and Wireless Networks", Mar. 28, 2006, 29 pages.
Fasolo, E., "Network Coding Techniques", Mar. 7, 2004, 14 pages.
US Office Action for U.S. Appl. Mo. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 11/644,638, dated Sep. 22, 2009, 13 pages.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
Sun, Sumei, et al., "Pseudo-Inverse MMSE Based QRD-M Algorithm for MIMI-OFDM", Jan. 1, 2006, pp. 1545-1549, vol. 3.
Dal Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
US Office Action for U.S. Appl. No. 12/040,653, dated Dec. 11, 2009, 33 pages.

(56) References Cited

OTHER PUBLICATIONS

PCT International Preliminary Report on Patent-Ability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2009/046014, dated Nov. 27, 2009, 8 pgs.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual conference on Information Sciences and Systems (CISS '05), The John Hopkins University, Baltimore, Md, USA, Mar. 2005.
Yiu, S., et al., "Distributed Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Fi ing", IEEE 62nd Vehicular Technology Conference, Sep. 2005, pp. 1829-1833, Piscataway, New Jersey, USA.
Adachi, Koichi, et al, "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
PCT International Search Report for PCT Patent Application No. PCT/US2009/046014, dated Nov. 27, 2009, 7 pgs.
Written Opinion of the International Searching Authority for PCT Patent Application No. PCT/US2007/013074, dated Dec. 2, 2009, 8 pgs.
US Office Action for U.S. Appl. No. 11/754,903, dated Mar. 29, 2010, 11 pages.
Japanese Office Action for related Japanese Patent Application No. 2009-513327, Aug. 7, 2012, 3 pgs. *English Translation*.
PCT International Search Report for PCT Patent Application No. PCT/US2009/053471, Dec. 15, 2009, 7 pgs.
PCT Writen Opinion of the International Searching Authority for PCT Patent Application No. PCT/US2009/053471, Dec. 15, 2009, 9 pgs.
PCT International Preliminary Report on Patentability for PCT Appl. No. PCT/US2009/034758, Aug. 31, 2010, 6 pgs.
PCT International Preliminary Report on Patentability for PCT Appl. No. PCT/US2009/046014, Dec. 6, 2010, 7 pgs.
PCT International Search Report for PCT Patent Application No. PCT/US2009/046014, Nov. 27, 2009, 3 pgs.
PCT Writen Opinion of the International Searching Authority for PCT Patent Application No. PCT/US2009/046014, Nov. 27, 2009, 6 pgs.
PCT International Preliminary Report on Patentability for PCT Appl. No. PCT/US2009/053472, Feb. 15, 2011, 5 pgs.
European Office Action for European Patent Application No. 09715574.1, Jan. 11, 2012, 6 pgs.
European Office Action for European Patent Application No. 08832132.8, Feb. 10, 2012, 5 pgs.
US Office Action for U.S. Appl. No. 12/700,585, dated Oct. 15, 2012, 9 pgs.
US Final Office Action for U.S. Appl. No. 12/209,110, dated Dec. 28, 2012, 40 pgs.
US Final Office Action for U.S. Appl. No. 12/476,066, dated Jan. 8, 2013, 16 pgs.
US Final Office Action for U.S. Appl. No. 12/538,739, dated Aug. 3, 2012, 35 pgs.
US Office Action for U.S. Appl. No. 12/546,471, dated Dec. 26, 2012, 11 pgs.
US Office Action for U.S. Appl. No. 12/558,367, dated Feb. 15, 2013, 13 pgs.
US Office Action for U.S. Appl. No. 12/772,717, dated Feb. 13, 2013, 11 pgs.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
Sen, et al., "Cute and jCUTE Concolic Unit Testing and Explicit Path Model-Checking Tool", Computer Aided Verification Lecture Notes in Computer Science, Jan. 1, 2006, pp. 419-423.
Majumdar, et al., "Hybrid Concolic Testing", IEEE 29th International Conference on Software Engineering, May 1, 2007, pp. 416-426.
Taddei, Nerve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.
Marsch, Patrick, et al., On multicell cooperative transmission in backhaul-constrained cellular systems, Annals of Telecommunications, May 1, 2008, pp. 253-269, vol. 63, No. 5/6.
Lang, Yidong, et al., "A Novel Resource Allocation Strategy for Distributed MIMO Multi•Hop Multi-Commodity Communiations", JEEE International ITG Workshop on Smart Antennas, Feb. 26, 2008, pp. 125-132.
Karakayali, M., et al., "On the Maximum Common Rate Achievable in a Coordinated Network", Mar. 3, 2006, 6 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages.
Caire, G., et al., "Multiuser MIMO Achievable Rates with Downlink Training and Channel State Feedback", 3 pages.
Caire, G., et al., "On the Achievable Throughput of a Multiantenna Gaussian Broadcast Channel", IEEE Transactions on Information Theory, vol. 49, No. 7, Jul. 2003, pp. 1691-1706.
Ernesto Zimmermann, "Complexity Aspects in Near-Capacity MIMO Detection-Decoding", Jan. 1, 2007, pp. 39-70.
Ernesto Zimmermann, et al., "Unbiased MMSE Tree Search Detection for Multiple Antenna Systems", Proceedings ofthe International Symposium on Wireless Personal Multimedia Communications, Sep. 1, 2006, pp. 806-810.
US Final Office Action for U.S. Appl. No. 11/873,248, dated Sep. 1, 2010, 21 pages.
US Office Action for U.S. Appl. No. 11/939,353 dated Jan. 31, 2011, 15 pages.
PCT International Preliminary Report on Patentability for PCT Patent Application No. PCT/US2009/046014, dated Dec. 16, 2010, 9 pages.
PCT International Search Report for PCT Patent Application No. PCT/US2010/033549, Jan. 5, 2011, 5 pgs.
PCT Written Opinion of the International Searching Authority for PCT Patent Application No. PCT/US2010/033549, Jan. 5, 2011, 6 pgs.
European Office Action for European Patent Application No. 08767750.6, dated Jan. 12, 2011, 6 pgs.

(56) References Cited

OTHER PUBLICATIONS

PCT International Search Report for PCT Patent Application No. PCT/US2010/027139, Dec. 6, 2010, 5 pgs.
PCT Written Opinion of the International Searching Authority for PCT Patent Application No. PCT/US2010/027139, Dec. 6, 2011, 6 pgs.
European Office Action for European Patent Application No. 08767751.4, Jan. 14, 2011, 5 pgs.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 12/209,110, dated Jul. 14, 2011, 26 pgs.
US Office Action for U.S. Appl. No. No. 12/335,409, dated Aug. 16, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
US Notice of Allowance for U.S. Appl. No. 12/538,733, dated Apr. 26, 2012, 6 pgs.
US Office Action for U.S. Appl. No. 12/476,066, dated May 30, 2012, 14 pgs.
US Notice of Allowance for U.S. Appl. No. 12/335,409, dated Jul. 19, 2012, 8 pgs.
US Office Action for U.S. Appl. No. 12/546,471, dated May 21, 2012, 11 pgs.
US Office Action for U.S. Appl. No. 12/209,110, dated Jun. 12, 2012, 39 pgs.
US Notice of Allowance for U.S. Appl. No. 11/644,638, dated Jun. 9, 2011, 11 pgs.
US Notice of Allowance for U.S. Appl. No. 12/121,634, dated Aug. 12, 2011, 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
US Office Action for U.S. Appl. No. 12/538,733, Oct. 18, 2011, 11 pgs.
US Office Action for U.S. Appl. No. 12/538,739, Dec. 7, 2011, 23 pgs.
US Final Office Action for U.S. Appl. No. 12/538,733, Mar. 27, 2012, 6 pgs.
US Final Office Action for U.S. Appl. No. 12/335,409, Mar. 19, 2012, 22 pgs.
US Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012, 8 pgs.
Anastasopoulos, Achilleas, et al, "Adaptive Soft-Input Soft-Output Algorithms for Iterative Detection with Parametric Uncertainty," IEEE Transactions on Communications, vol. 48, No. 10, Oct. 2000, pp. 1638-1649.
Catt, "Non-codebook Based Pre-Coding for E-UTRA TDD Downlink," <http://www.3gpp.org/ftp/tsg_ran/WG1_RL1/TSGR1_46bis/Docs/R1-062792.zip>, Oct. 9-13, 2006, 3 pages.
Dietrich, F.A., et al,"Robust Tomlinson-Harashima Precoding for the Wireless Broadcast Channel," IEEE Transaction on Signal Processing, vol. 55, Issue 2, Feb. 2007, pp. 631-644.
Wang, D, et al, "Low Complexity Iterative Receiver for Multiuser STBC Block Transmission Systems," vol. 2, Nov. 2004, pp. 1086-1090.
Japanese Office Action for related Japanese Application No. 2010-525898, dated Jul. 2, 2013, 6 pages *English Translation*.
Japanese Office Action for related Japanese Application No. 2012-509901, dated Feb. 25, 2014, 6 pages *English Translation*.
Michalke, Clemens, et al, "Linear Mimo Receivers vs. Tree Search Detections: A Performance Comparison Overview," IEEE PIMRC'06, Sep. 1, 2006, pp. 1-7.
Papadopoulos, Haralabos C, et al, "Network Coding Over Time-Varying Networks by means of Virtual Graphs," IEEE Global Telecommunications Conference, GLOBECOM '07, Nov. 26-30, 2007.
US Final Office Action for U.S. Appl. No. 12/558,367, dated Sep. 19, 2013, 17 pages.
US Office Action for U.S. Appl. No. 12/558,367, dated Jan. 9, 2014, 26 pages.
US Final Office Action for U.S. Appl. No. 12/772,717, dated Aug. 28, 2013, 11 pages.
US Office Action for U.S. Appl. No. 12/772,717, dated Mar. 26, 2014, 11 pages.
US Provisional Application for U.S. Appl. No. 60/829,839, filed Oct. 17, 2006, 34 pages.

* cited by examiner

Graph-1 (G1)

Graph-2 (G2)

Virtual Graph (VG)

Graph-1 (G1)

Graph-2 (G2)

Virtual Graph (VG)

METHOD AND APPARATUS FOR PRIORITIZED INFORMATION DELIVERY WITH NETWORK CODING OVER TIME-VARYING NETWORK TOPOLOGIES

PRIORITY

The present patent application claims priority to and incorporates by reference the corresponding provisional patent application Ser. No. 60/906,999, titled, "A Method and Apparatus For Prioritized Information Delivery With Network Coding Over Time-Varying Network Topologies," filed on Mar. 13, 2007.

FIELD OF THE INVENTION

The present invention relates in general to managing and sending information over networks in a prioritized fashion; more specifically, embodiments of the present invention are related to priority-based queuing, quality of service (QoS), network coding, routing, and network management to facilitate prioritized information delivery with network coding over time-varying network topologies.

BACKGROUND OF THE INVENTION

Network coding and Quality of Service (QoS) provisioning are well-known in the art. With respect to QoS provisioning, traditional schemes can be seen as a complement rather than an alternative to technologies described herein. Traditional schemes either treat the problem at the routing layer to find better paths (e.g., low delay, high bandwidth, minimum energy, etc.) or at the scheduler level to provide service differentiation across packets of different flows. For instance in H. Zhang, "Service disciplines for guaranteed performance service in packet-switching networks," in the Proceedings of the IEEE, vol. 83, no. 10, October 1995 and R. Guerin and V. Peris, "Quality-of-Service in Packet Networks: Basic Mechanisms and Directions," invited Paper, Computer Networks, Vol. 31, No. 3, February 1999, pp. 169-179, the authors present a survey of various service disciplines to be employed at a scheduler for guaranteed performance locally and end-to-end in packet-switching networks. These studies provide per-link guarantees or service differentiation for simple copy-and-forward based routing strategies. One can also provide differentiation at the Medium Access Control (MAC) layer. For example, in one well-known scheme, traffic is separated at the MAC layer into different (actual) queues, each with different probabilistic advantages to gaining access to the medium. One can further provide service differentiation at the physical layer, using different channel codes for different traffic classes.

Network coding has been discussed as a method for attaining the maximum jointly attainable throughput in a multicast session. FIG. 1A shows a sample network topology graph with one sender ($S_1$), two receivers ($R_1$ and $R_2$) and four routers (labeled 1 to 4). Each vertex of the graph corresponds to a unique node in the network and each edge between a pair of vertices corresponds to the network interface/link between those vertices. In FIG. 1A, each edge can carry one symbol per unit time. A symbol for purposes herein can be a bit, a block of bits, a packet, etc. The terms "symbol" and "packet" are also used interchangeably herein. The best routing strategy that only copies an incoming symbol to an outgoing interface can deliver at best 1.5 symbols per receiver per unit time. This strategy is shown in FIG. 1A. The main limiting factor for the pure routing strategy, which only relies on a simple copy-and-forward mechanism, is at a bottleneck node (i.e., node 3). At node 3, the incoming interfaces have more bandwidth than the outgoing interfaces and decisions must be made as to which (proper) subset of the incoming symbols must be forwarded. For instance, in FIG. 1A, node 3 is a bottleneck node because it has two incoming interfaces with a total bandwidth of 2 symbols per unit time, and one outgoing interface with a total bandwidth of 1 symbol per unit time. Hence, when node 3 receives the two symbols "a" and "b" on each interface per unit time, it must either forward "a" or "b" on the outgoing interface, or some subset such as half of each portion of information. By allowing, however, each node (e.g., router) to send jointly encoded versions of sets of symbols (or packets) arriving at the incoming interfaces in each use of any outgoing interface, in general, coding strategies can be designed that outperform routing.

For the network shown in FIG. 1A, an example of such a coding strategy (referred to herein as "network coding") is depicted in FIG. 1B. Instead of just copying an incoming symbol, node 3 performs a bit-wise modulo-2 addition (i.e., XOR two symbols) and sends (a+b) over the link between nodes 3 and 4. As a result of this operation, $R_1$ receives a and (a+b) on two incoming interfaces, and can thus compute b by bitwise XORing a and (a+b). Similarly, $R_2$ receives b and (a+b), and can also deduce a. As a result, network coding achieves on this network a multicast rate of 2 symbols per receiver per unit time, a 33.3% improvement over the 1.5 symbols per receiver per unit time attained by the routing-only strategy.

Network coding was originally proposed as a method for maximizing throughput in a multicast setting, i.e., for maximizing the minimum flow between any sender-receiver pair. It has been shown that encoding information at the interior nodes of the network achieves the multicast capacity (i.e., the minimum value of capacity over all cuts on the corresponding topology graph between the sender and any of the receivers) while simple routing (i.e., forwarding of the information), in general, does not. A cut between a source and a destination refers to a division of the network nodes into two sets, whereby the source is in one set and the destination is in the other. A cut is often illustrated by a line dividing the network (in a 2-dimensional space) into two half-planes, see T. H. Cormen, C. E. Leiserson, R. L. Rivest, and C. Stein, *Introduction to Algorithms,* $2^{nd}$ Edition, MIT Press and McGraw-Hill, pp. 643-700, 2001. The capacity of a cut is the sum of the capacities of all the edges crossing the cut and originating from the set containing the source and ending in nodes in the set containing the destination. The capacity of a cut also equals the sum of the transmission rates over all links crossing the cut, and transferring data from the set including the source to the set including the set including the destination. The cut with the minimum capacity is referred to herein as the "min cut" of the graph. The minimum cut equals the maximum flow through the entire graph (a fact known as the max-flow min-cut theorem), see T. H. Cormen, C. E. Leiserson, R. L. Rivest, and C. Stein, *Introduction to Algorithms,* $2^{nd}$ Edition, MIT Press and McGraw-Hill, pp. 643-700, 2001.

It is also well-known that linear encoding (i.e., linear combinations of incoming packets performed at the interior nodes) is sufficient to achieve the capacity of multicast networks. Furthermore, there exists polynomial-time algorithms to construct such multicast capacity achieving network codes in a deterministic fashion for a given fixed network topology. There also exists an algorithm for constructing network codes to recover from non-ergodic network failures (e.g., removal of a connection between two interior nodes) without requiring adaptation of the network code to the link failure pattern so long as the multicast capacity remains achievable under the given failure. For example, see R. Koetter and M. Medard, "An algebraic approach to network coding", IEEE/ACM Transactions on Networking, Vol. 11, No. 5, pp. 782-795, October 2003. This requires knowledge of the family of failure patterns under which the network graph can still sustain the same multicast capacity. Hence, the existence of a network code design without knowing a priori exactly which failure will occur, but with the knowledge that any, but only one, failure in the family of failure patterns can occur at a given period of time.

The drawbacks of such approaches are that the network topology has to be available, i.e., the connections between the network nodes as well as their individual rates have to be known in order to derive the encoding and decoding operations at every node. Therefore, encoding and decoding algorithms are built for a given topology. The network codes that are generated by these code-construction algorithms usually change when the topology changes. There is an exception involving a multicast setup with link failures where robust multicast can be achieved with a static network code. The multicast results require that, as the network changes, the minimum cut capacity remains at least as large as the throughput of the designed static code. Alternatively, these techniques allow the use of a static code for multicasting at the minimum (over time) cut capacity, which may be considerably lower than the throughput achievable by network coding over the entire set of time-varying networks. Approaches to network coding in the prior art also assume that the networks are delay-free and acyclic, which, in general, is not the case for real networks. Furthermore, they do not consider different QoS classes.

A distributed scheme has been proposed that is robust to random packet losses, delays, cycles, as well as to any changes in the network topology (or capacity) due to nodes joining, leaving the network, node or link failures, congestion, etc. In this scheme, random network coding is used whereby the coefficients of the linear combination of incoming packets at every node are chosen randomly within a field of size 2. A value of m=8 (i.e., a field of size 256) has been shown to usually be large enough to recover the original source packets at any receiver with high probability. This scheme is distributed in the sense that it does not require any coordination between the sender and the receivers. Receivers can decode without knowing the network topology, the local encoding functions, or the links that have failed. This decentralization of network coding is achieved by including the vector of random coefficients within each encoded packet, at the expense of bandwidth (i.e., small overhead associated with the transmission of this extra information). A PET (Priority Encoding Transmission)-inspired erasure protection scheme at the source allows for providing different levels of protection to different layers of information. Also, in this scheme, a receiver can recover the symbols (in the given Galois field) in the most important layer by receiving only one encoded packet. Symbols in the second most important layer can be recovered if the receiver receives at least two linearly independent encoded packets, symbols in the third most important layer can be recovered if the receiver receives at least three linearly independent encoded packets, and so on. The proposed PET scheme is efficient, in the sense that it incurs the minimum required increase in rate in achieving this goal. However, this minimal increase in rate is still quite significant due to the stringent requirements/goals imposed on the scheme (e.g., that the top priority layer can be recovered from any single received packet, the top two priority layers can be recovered from any two received packets, etc.).

There are drawbacks associated with random distributed network coding, however. Firstly, each encoded packet has some overhead (e.g., random code coefficients) that has to be communicated to the receiver. This overhead may be significant for small-sized packets (e.g., in typical voice communications). Secondly, some encoded packets may not increase the rank of the decoding matrix, i.e., they may not be classified as "innovative" in providing additional independent information at the receiving nodes of these packets. These non-innovative packets typically waste bandwidth. As a result, the average time it takes to decode an original source packet in general increases. Transmission of non-innovative packets can be avoided by monitoring the network, i.e., each node arranges with its neighbors to transmit innovative packets only by sharing with them the innovative packets it has received so far. However, such additional monitoring uses extra network resources that could be used for other purposes. Random codes also have the processing overhead due to the use of a random number generator at each packet generation, decoding overhead due to the expensive Gaussian Elimination method they use, and decoding delay due to the fact that rank information of random matrices does not necessarily correspond to an instantaneous recovery rate and one may have to wait until the matrix builds enough rank information to decode partial blocks. The methods that guarantee partial recovery in proportion to the rank information require extra coding which can substantially increase the overhead.

A robust network code does not necessarily have to be random. For example, in one forwarding architecture for wireless mesh networks (COPE), coding opportunities are detected and exploited to forward multiple packets in a single transmission. Each node uses simple XOR operations to encode specific received packets; the packets to encode together are selected such that the node neighbors will be able to decode the coded packets (the method is called "opportunistic" coding). Therefore the bandwidth is used carefully to improve throughput. However, there are some drawbacks associated with this scheme as well. First, a node has to know what packets its neighbors have in order to send them useful (or innovative) packets. A node learns about its neighbors' state through "reception reports" that each node broadcasts in the network to let its neighbors know about which packets it has stored. These broadcast transmissions utilize bandwidth. Second, although the broadcast medium is exploited to let every node "hear" packets from other nodes for free ("opportunistic" listening), this can have security implications in the case that packets are not encrypted.

SUMMARY OF THE INVENTION

A method and apparatus is disclosed herein for information delivery with network coding over time-varying network topologies. In one embodiment, the method comprises decomposing a sequence of topology graphs that model a time-varying network topology into a plurality of virtual graphs, where each virtual graph of the plurality of virtual graphs corresponds to a distinct traffic class, and the virtual topology graph representing a partial topology of a time-varying network. The method also includes selecting a network code for each virtual graph in the plurality of the virtual graphs to meet requirements of the distinct traffic class corresponding to said each topology graph, where the network code is used to encode packets of the associated traffic class, and processing packets of each traffic class using the network code determined by its corresponding virtual topology and the requirements of said each traffic class, including using a virtual buffer system to implement the network code corresponding to each traffic class over the physical network topology. The method also includes using a scheduler to determine the transmission schedules for each output packet from the virtual buffer system of each traffic class where the scheduling decisions are based, at least in part, on the QoS requirements of each class

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
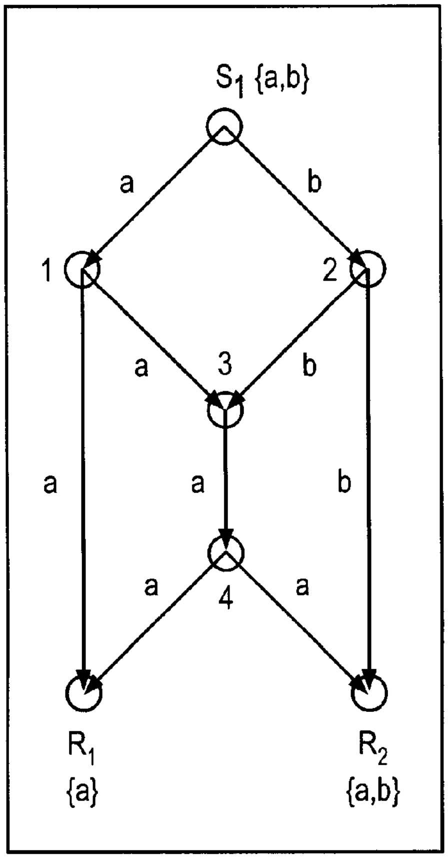
FIGS. 1A and 1B show sample network topology graphs that contrasts traditional routing with network coding.
Figure 1B:
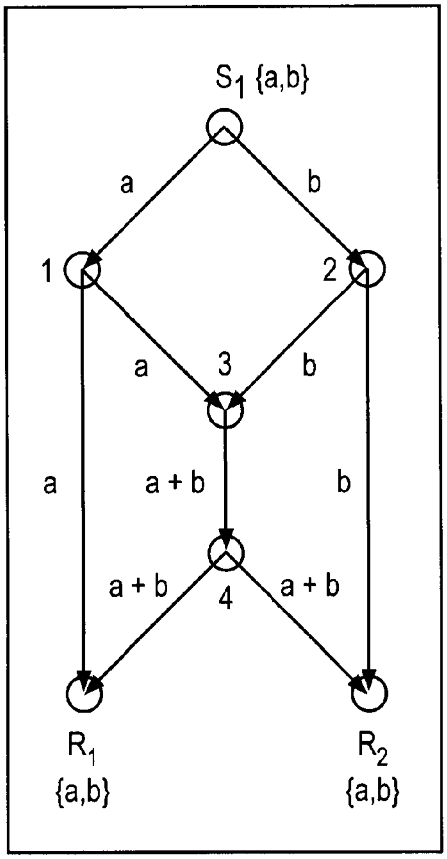

Methods and apparatuses for performing network coding with prioritized information over time-varying topologies are disclosed. Embodiments of the invention provide a systematic way of improving, and potentially maximizing, the amount of information delivered between information sources (i.e., senders) and information sinks (i.e., receivers) over an arbitrary network of communication entities (e.g., relays, routers), while providing Quality of Service (QoS) differentiation between different subsets of the total information. Such QoS differentiation, in particular, may consist of different levels of delivery guarantee and/or delay given the time-variability of the underlying communication network.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Communication networks are in general subject to changes (e.g., in connectivity and connection speeds) over the time of information delivery. These networks comprise a collection of network nodes, where each network node (e.g., sender, receiver, relay, router, etc.) consists of a collection of incoming physical interfaces that carry information to this node and a collection of outgoing physical interfaces that carry information away from this node. The network topology can change over time due to interface failures, deletions or additions, node failures, and/or bandwidth/throughput fluctuations on any physical interface or link between interfaces. Relative to a given information source in question variations may also be created by other competing information sources.

Embodiments of the present invention can achieve throughputs close to the maximum achievable one for each receiver given such fluctuations of and constraints on the traffic. Such embodiments also differentiate between different subsets of the delivered information (e.g., the packets with different priorities) and provide different quality of service protection based on QoS requirements of each subset while changes occur in the network topology. Such a provision is particularly attractive for media streams which by nature tend to be made of different subsets of information each with a different QoS delivery requirement. In one embodiment, different flows of varying QoS constraints are delivered between the same groups of senders and receivers. For such a case, embodiments of the invention provide a network coding-based approach to satisfy high throughput operations and at the same time to provide differentiated delivery performance (e.g., lower delay, jitter, etc.) matched to the requirements of different subsets (i.e., different traffic classes).

In one embodiment, a process for prioritizing information delivery with network coding over a time-varying network comprises (i) the decoupling of the network topology into multiple virtual topologies, each corresponding to a distinct traffic class, (ii) designing network codes with respect to each virtual topology separately, and (iii) processing each traffic class with respect to the virtual buffer system determined by its corresponding virtual topology and its network code.

Figure 2:
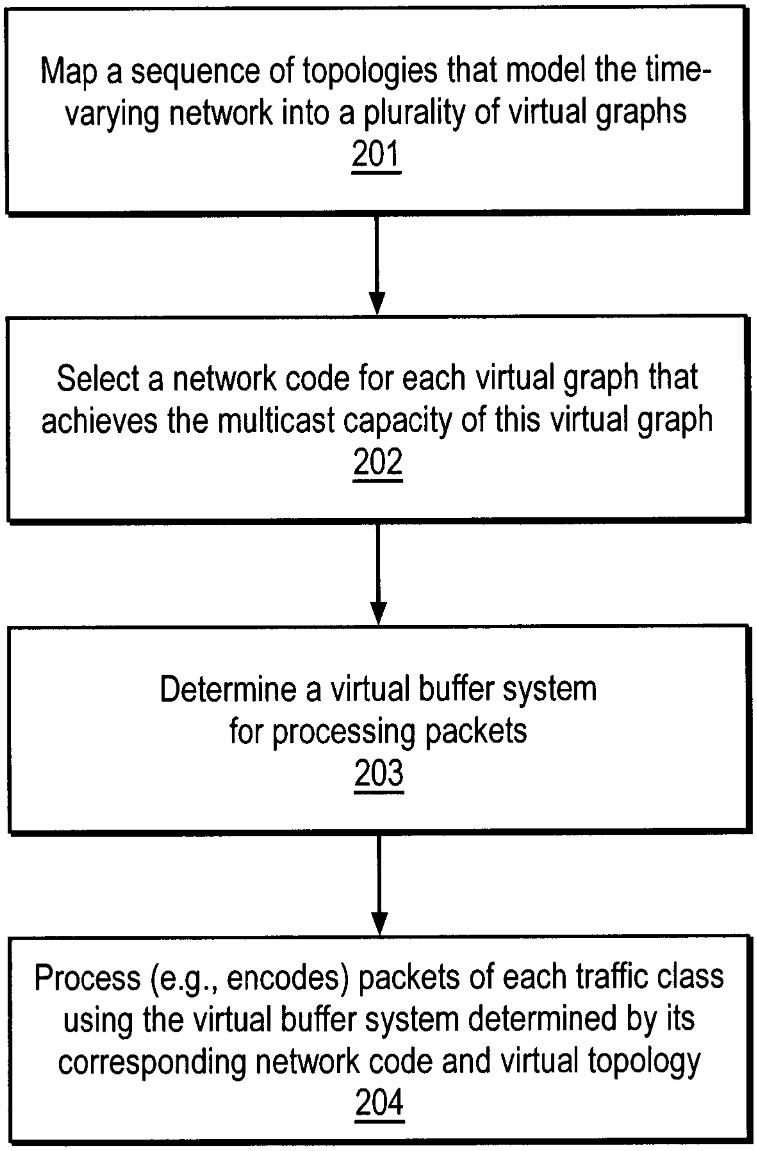
FIG. 2 is a flow diagram of one embodiment of a process for prioritized information delivery.

FIG. 2 is a flow diagram of one embodiment of a process for prioritized information delivery. The process is performed by processing logic that may comprise hardware (circuitry, dedicated logic, etc.), software (such as is run on a general purpose computer system or a dedicated machine), or a combination of both.

Referring to FIG. 2, the process begins by mapping a sequence of topologies that model the time-varying network into a plurality of virtual graphs (processing block 201). In one embodiment, this mapping is performed by first forming one virtual graph from the sequence of topologies and then decomposing this single virtual graph into a set of virtual sub-graphs. In one embodiment, the single virtual graph is decomposed into the set of virtual sub-graphs by decomposing the sequence of topologies into parallel sequences of topologies and computing a virtual graph for each sequence. In one embodiment, each of the virtual graphs comprises a distinct QoS class and the decomposition is performed with respect to the constraints of the particular QoS class.

After forming a plurality of virtual graphs, processing logic selects a network code for each virtual graph that achieves the multicast capacity of this virtual graph (processing block 202). When each virtual graph is formed with respect to the QoS constraints of a particular class, the selected network code then is used to encode packets of the associated traffic class. In another embodiment, the selection of a network code is performed by constructing the network code. The construction of a network code may occur using an algorithm that receives information about nodes, edges and edge weights. Alternatively, in one embodiment, selection of the network code occurs by choosing among a number of existing a-priori determined network codes that may be used and then using that network code for encoding.

In one embodiment, each selected network code determines an intra-class buffering system. The network code determines which packets of which interface should be buffered for how long. The interface can be an incoming or outgoing interface. The topology decomposition determines which QoS class gets how much bandwidth on an outgoing interface or what maximum delay can be incurred.

Next, processing logic determines a virtual buffer system for processing packets (processing block 203). The virtual buffer system is determined by its corresponding virtual topology and its network code. An example of a virtual buffer system that is used in one embodiment of the present invention is described in U.S. application Ser. No. 60/829,839, filed on Oct. 17, 2006, entitled "A Method and Apparatus for Efficient Information Delivery Over Time-varying Network Topologies," Kozat et al., incorporated herein by reference and described in "Network Coding Over Time-varying Networks by means of Virtual Graphs," by Papadopoulos et al., published in the Proceedings of Globecom 2007. The virtual buffer system at each node implements: (i) the local encoding functions of its network code by mapping input packets to output packets on outgoing physical interfaces and buffering input packets upon arrival and output packets for transmission; and (ii) the mechanisms to determine the buffering time of input packets and the associated number of output packets generated at each node. In one embodiment, the virtual buffer system may also have algorithms for updating the encoding functions at each node given deviations from the predicted transmission opportunities.

Processing logic processes (e.g., encodes) packets of each traffic class using the virtual buffer system determined by its corresponding network code and virtual topology (processing block 204). In one embodiment, a one-to-one correspondence exists between each QoS class and a network code used for the QoS class. In one embodiment, the processing logic processes packets of each traffic class using the network code by encoding packets for each QoS class separately at each network node and placing encoded packet data associated with said each QoS class generated at each network node into respective priority queues at an outgoing physical interface of each network node.

Embodiments of the present invention provide service differentiation by decoupling a sequence of topologies that model a time-varying network topology into two or more virtual topologies, each corresponding to a different QoS, or traffic class. That is, in one embodiment, a service-aware solution computes different virtual topologies suitable for different QoS classes. One virtual topology for instance can represent a stable (i.e., less time-invariant) portion of the network, while another virtual topology can correspond to less predictable portion of the network with a lot of fluctuations around a significantly high average bandwidth/throughput. The first virtual topology then can be used for delay-sensitive traffic, whereas the second one can be used for best-effort type traffic. The example can be generalized further to more than two classes and to other QoS constraints.

In one embodiment, once the virtual topologies are computed, the corresponding network code functions are computed and the virtual buffer system is determined. This may be performed as it is done in U.S. application Ser. No. 60/829,839, filed on Oct. 17, 2006, entitled "A Method and Apparatus for Efficient Information Delivery Over Time-varying Network Topologies," U. C. Kozat, H. Papadopoulos, C. Pepin, S. Ramprashad, C-E. W. Sundberg for each topology, incorporated herein by reference. Hence, each QoS class is encoded separately at each node and the encoded information of each class can then be placed on their respective priority queues at the outgoing physical interface.

One embodiment of the invention handles the service differentiation problem at the network topology level where the capacities of the minimum cuts are shared across flows rather than at the switches only. Flows are differentiated with respect to their priority levels, as well as (with respect to) their associated network coding functions and corresponding routes to obtain a better service. That is, embodiments of the present invention go beyond queue differentiation, matching virtual queues to network codes to topologies in a non-trivial, non-obvious, joint consideration.

In one embodiment, each virtual graph corresponds to a service class and a unique fixed network code is designed with respect to each virtual graph separately. One embodiment of the present invention includes the design and use of a collection of fixed network codes over a (finite- or infinite-length) sequence of networks for disseminating information from a set of sources to a set of destinations, while differentiating among the distinct service classes that exist in the information. That is, during a prescribed period of time over which a network can be changing, a single network code is selected for each class to operate effectively and efficiently over network variations. This may be applied to any type of network (e.g., multicast, unicast, multiple users). In the case that (the same) information is multicast from a source to a set of destinations, the proposed scheme achieves high and, under certain conditions, the maximum achievable multicast rate.

The implementation of each fixed network code relies on the use of virtual input and output buffers specifically defined for each network code. These input (output) buffers are used as interfaces between the input (output) of the fixed network code and the actual input (output) physical interfaces. The collective effect of all these virtual buffers at each node is to implement the fixed network code (designed for a specific virtual topology) over the sequence of time-varying topologies that arise over the network while attaining the maximum achievable multicast throughput. Each network code along with its collection of virtual input and output buffers are specifically used for the packets/blocks of the same service class, i.e., different service classes are isolated from each other through the network coding layer. Each virtual output buffer can be served over the common shared resource through the use of a packet scheduler, allocating bandwidth in compliance with the properties of the virtual graph associated with the given virtual output buffer.

Virtual Graphs

Figure 10:
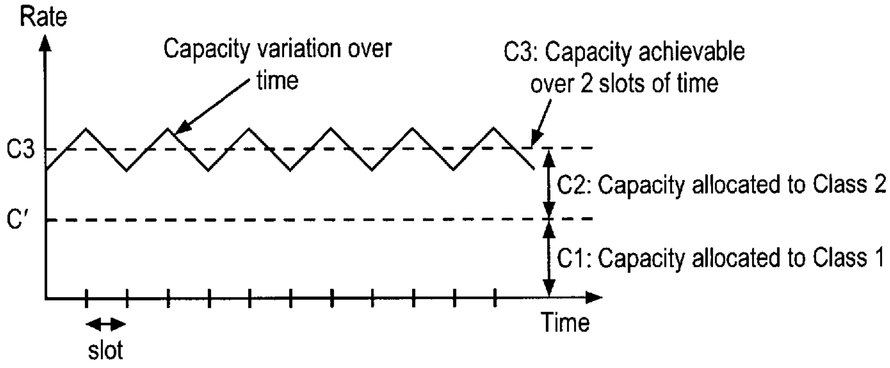
FIG. 10 illustrates an example of splitting capacity on a link into two subsets.

In one embodiment, each virtual graph corresponding to a service class can be computed using the path delays, capacity, buffer size statistics, and QoS constraints of the service class (e.g., mean end-to-end delay, delay jitter, minimum bandwidth, etc.). For example, consider a single link with a capacity variation as illustrated in FIG. 10 described further below. One could split (or provision) this link into two parts, one delivering a rate of "C1" over any and within any time slot, and one able to deliver an additional rate "C2=C3−C1" over any two consecutive slots. The first part has a lower required delay for achieving its delivery rate. One part could be assigned to one virtual graph, and the other to a second virtual graph.

Each virtual graph can be directly derived from a sequence of observed time-varying topologies. One way of implementation is to decompose each observed topology graph into a union of graphs, where each graph is suitable for a given service class. If there are J service classes, this generates J distinct sequences of time-varying topologies. Then, for each service class, a virtual graph can be generated as a function of its own sequence of time-varying topologies (see FIG. 11 described below). Alternatively, first a base virtual graph can be formed and using the edge and min-cut statistics, the base virtual graph can be partitioned into a set of virtual sub-graphs each for one service class.

In another embodiment, the union operation across the virtual graphs can be a subgraph of the "time-averaged" network. For purposes herein, the union operation on the graphs amounts to taking the union of the vertex and the edge sets of each graph and summing up the weights/capacities of the common edges across the graphs. A graph $G_A$ is a subgraph of $G_B$ if all the vertices and the edges of $G_A$ are also part of $G_B$ and each edge in $G_A$ has no more weight (i.e., capacity) than the same edge in $G_B$. In one embodiment, for instance, where the "time-averaged" sequence of networks converges as the averaging window becomes longer, a collection of virtual graphs (i.e., one virtual graph for each class) are generated whose union becomes equivalent to the "time-averaged" network.

In one embodiment, the partitioning/decomposition of the base graph into a union of individual-class virtual subgraphs takes into account the throughput requirements and delay characteristics of the individual class, and may also exploit estimates of the variability (e.g. variance) over time of the individual link capacities. In a two-class case for example, the partitioning of the base graph into two subgraphs can be performed in such a way that the sum of the individual throughputs equals the throughput delivered by the base graph, while at the same time guaranteeing that there is less variability (over time) over the subgraph used to deliver the high-priority data.

In one embodiment, the construction of a virtual network topology (e.g., directly for a service class or to be used as a base graph) requires a prediction of the time-averaged topology for the upcoming period. This can be formed in a variety of ways. In their simplest form, these estimates may be generated by weighted time-averaging capacities/bandwidths/throughputs of each link until the end of the previous period. In general, however, they may be obtained via more sophisticated processing that better models the link capacity/bandwidth/throughput fluctuations over time and may also exploit additional information about the sizes of the virtual buffers throughout the network.

In another embodiment, a sequence of updated sets of network codes to be sequentially implemented over a sequence of time intervals is selected. In particular, during any given update a new network code is chosen that is to be used over the next time period (i.e., until the next update) for each service class. The need for a new network code can be due to the changes in network topology or in the requirements of any of the service classes.

Instead of observing the same network topology with the same set of nodes, links, and link bandwidths over time, a sequence of network topologies is observed where each topology differs from the previous one either in terms of a change in the set of nodes, a change in the set of links, or a change in bandwidth of any of the existing links.

Figure 3:
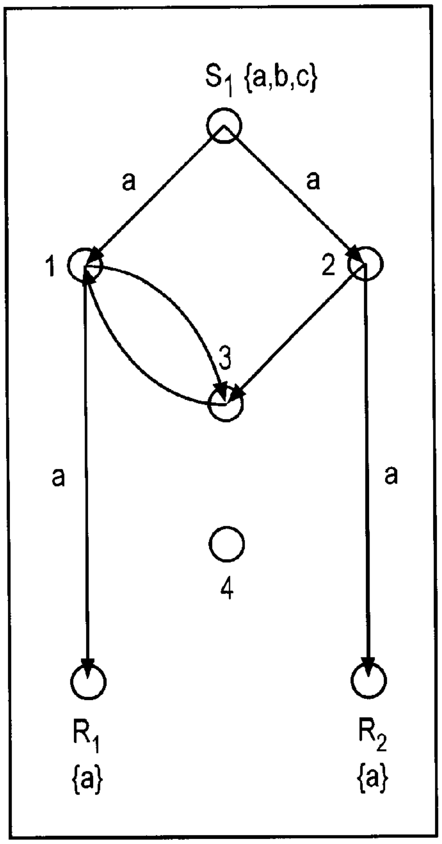
FIG. 3 depicts an example of time-varying topology with link and node failures to illustrate how multicast capacity is maximized on each topology instance.
Figure 3:
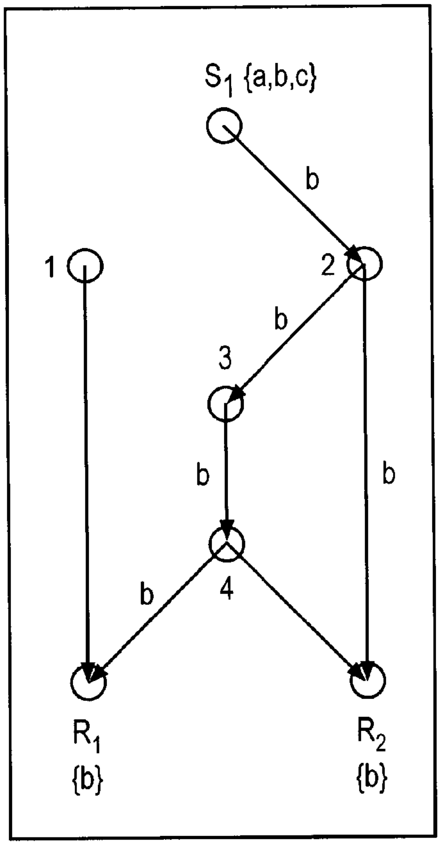

FIG. 3 depicts an example of time-varying topology with link and node failures. In the example, the network topology alternates in equal-duration cycles between two states corresponding to the topology graphs G1 and G2. In other words, this topology varies over a sequence of epochs with different topologies $\{G1, G2, G1, G2, G1, \ldots\}$, where each epoch lasts for a fixed number of symbol durations. Each edge has unit capacity, i.e., it can deliver one information unit per link use.

When G1 is observed, node 4 fails and so do all the interfaces incoming to and outgoing from node 4. When G2 is observed, the links from S1 to node 1, node 1 to node 3, and node 3 to node 1 fail. During each epoch where G1 or G2 is observed, one can deliver a maximum of 1 symbol per receiver per unit time. In fact, in this case, the "network coding" strategy is equivalent to a simple routing (i.e., copy and forward) algorithm. Therefore, accordingly, if one tries to optimize the information delivery over each epoch separately, one can at most deliver 1 symbol per receiver per unit time. The optimal strategy (in terms of maximizing the average throughput) maps the sequence of graphs onto a single virtual (time-averaged) graph, then designs and uses a network code for the topology presented by this virtual graph. This virtual graph reflects the long-term network behavior. Thus, it allows one to opportunistically take advantage of the instantaneously available capacities over each link to be used at a later time when the current bottleneck conditions change due to the variations inside the network.

Figure 4:
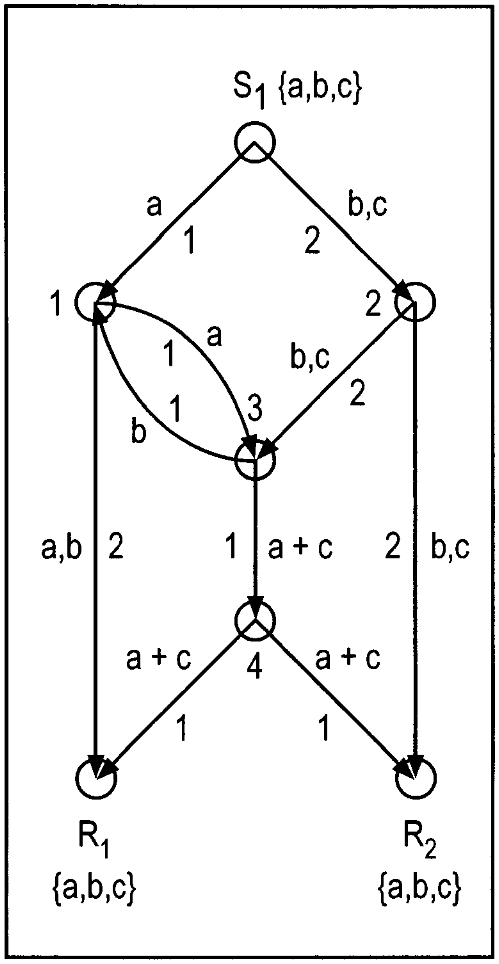
FIG. 4 is an example of virtual graph derived from the sequence of measured topologies assuming G1 and G2 in FIG. 3 are observed in equal length epochs.

FIG. 4 is an example of virtual graph derived from the sequence of measured topologies assuming G1 and G2 in FIG. 3 are observed in equal length epochs. The virtual topology is simply formed by computing an average graph whose edge weights are equal to twice the average link capacities observed between the node pairs of the graph. The virtual graph and the associated network code strategy shown in FIG. 4 can deliver 1.5 symbols per receiver per unit time. (Although the virtual graphs can deliver 3 symbols per receiver, since each edge capacity is scaled up by two on the virtual graph with respect to the average graph. The resulting capacity, per unit time, is scaled down accordingly by 2.) The multicast capacity achievable over this virtual graph is the maximum throughput one can achieve over the sequence of {G1, G2, G1, G2, . . . } with each G1 and G2 lasting equal length epochs.

In general, however, a throughput maximizing network code with respect to this graph on its own does not need to provide a service differentiation between the packets incoming to the node (possibly from multiple interfaces). For the example in FIG. 3, some information is recovered at the receivers after two epochs (or more) of time. It could be that the network would like to guarantee that either "a" or "b", or subsets of"a" or "b", arrive at receivers with less delay.

Figure 5:
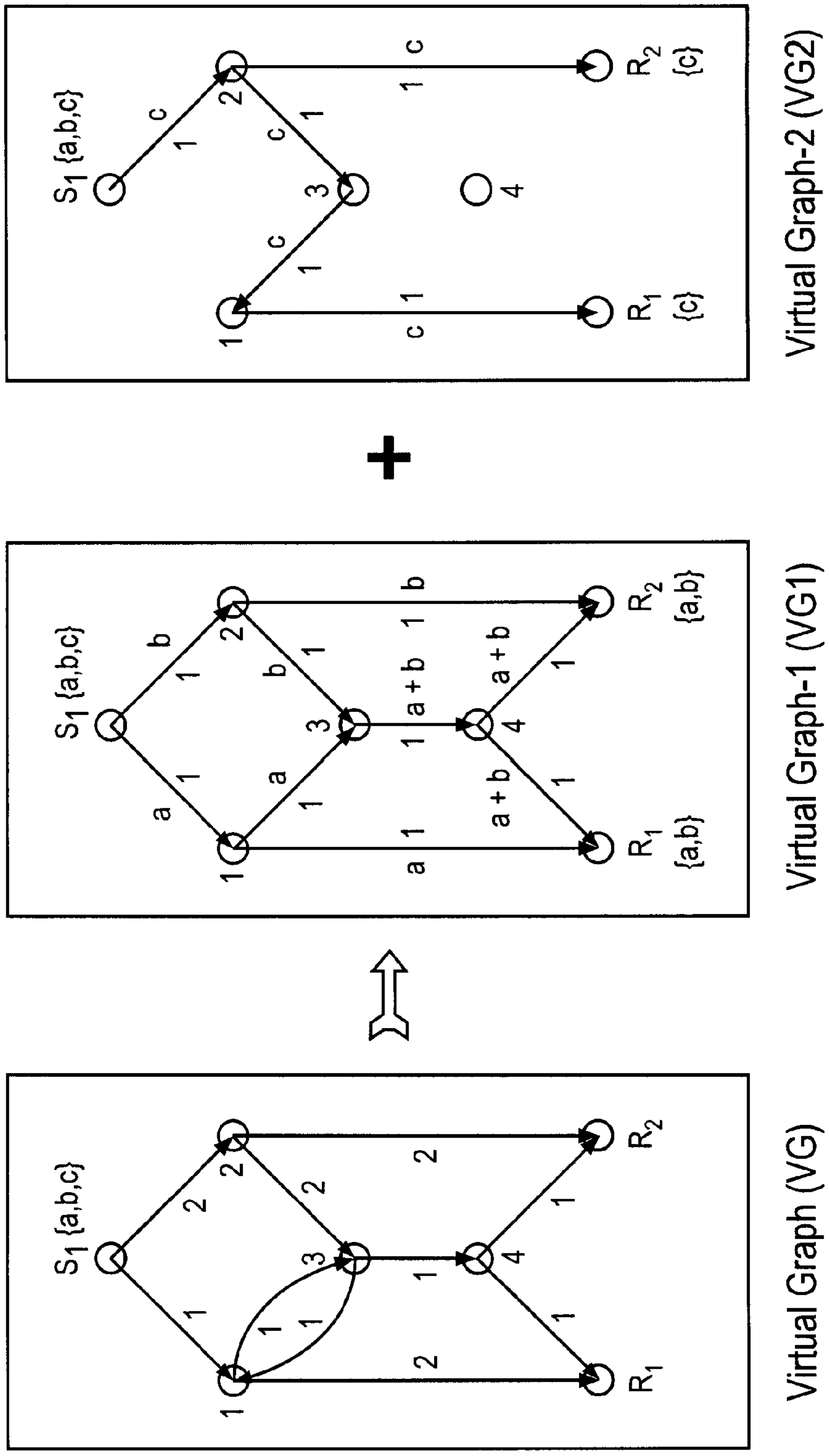
FIG. 5 illustrates an example of a decomposition of the virtual graph into two virtual graphs.

FIG. 5 illustrates an example of a decomposition of the virtual graph into two virtual graphs. In this specific case, the virtual graphs and their throughput maximizing coding strategies are different, while they might be the same in other decompositions. In one embodiment, the virtual graph for any given QoS class is used to select a corresponding network code and to set up the associated virtual buffer system. The decomposition also preserves the total multicast capacity of 1.5 symbols per receiver per unit time.

Figure 6:
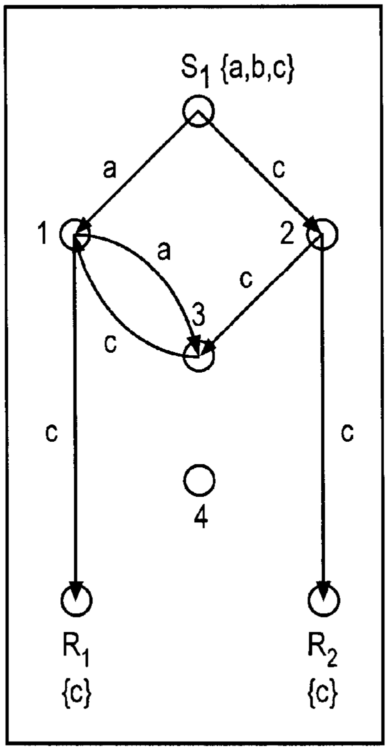
FIG. 6 shows the manner in which two network codes corresponding to each virtual graph can be implemented over the actual sequence of physical topologies.
Figure 6:
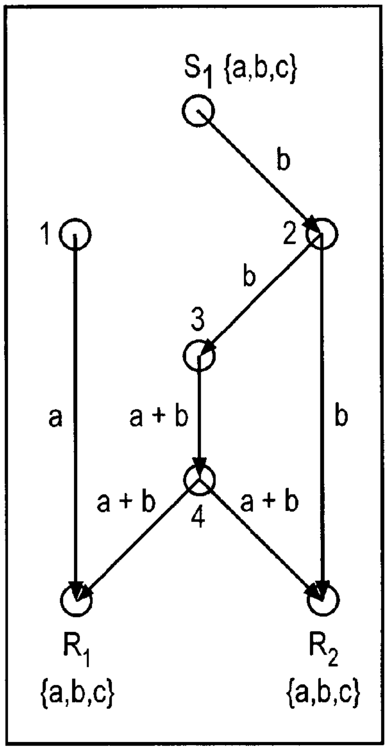

FIG. 6 shows the manner in which the two network codes corresponding to each virtual graph can be implemented over the actual sequence of physical topologies. Each network code requires proper buffering of information to be able to apply the designed network code. Referring to FIG. 6, when G1 is observed, the information units (or flow) labeled as "c" (can be also referred to as the delay-sensitive traffic class) are routed with no additional buffering/encoding delay that is typically incurred for network coding. On the other hand, the information units labeled as "a" are stored at node 3 until information units labeled as "b" arrive at the other interface. Flow b is sent during the subsequent epoch over G2. During this epoch, node 3 performs the coding function a+b (i.e., bit-wise XOR operation) and forward the coded block to node 4. In this example, information flows a and b are part of the best-effort traffic class. As implicitly suggested by the example, the information flows are divided into separate classes and some means of identifying each flow is required. Accordingly, each flow can be processed with the right network coding and forwarding operations.

Figure 7:
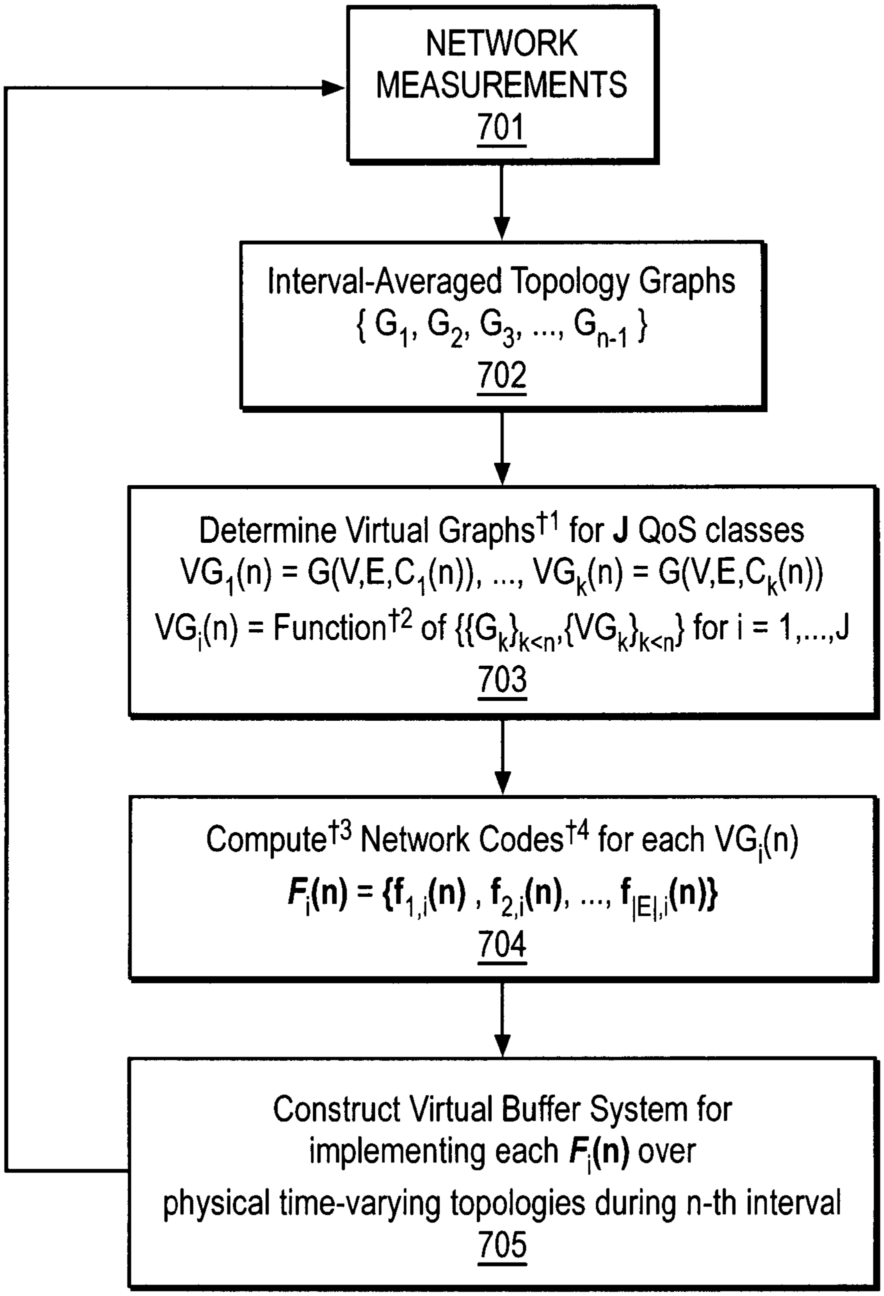
FIG. 7 is a flow diagram of one embodiment of a process for network coding over time-varying network topologies.

FIG. 7 is a flow diagram of one embodiment of a process for network coding over time-varying network topologies. The process is performed by processing logic that may comprise hardware (circuitry, dedicated logic, etc.), software (such as is run on a general purpose computer system or a dedicated machine), or a combination of both.

It is assumed that time is partitioned into intervals (henceforth referred to herein as "sessions") of potentially different durations $T_1$, $T_2$, $T_3$, etc. Over the n-th time interval (session), the invention comprises the following interconnected operations: (i) the generation of a collection of virtual graphs, $VG_1(T_n), \ldots, VG_J(T_n)$ (one for each of the J service classes) for the duration of session "n"; (ii) the construction of a network code to use with each virtual graph; (iii) the implementation of the network code (designed for the virtual graph) over the sequence of time-varying topologies during the n-th session by utilizing virtual buffers. Note that the virtual graphs can be computed using link-capacity measurements collected in the network during all cycles of (or a subset of the most recent) past sessions, e.g., time-averages of past m sessions. Operations (i) and (ii) are performed at the outset of the n-th session, while operation (iii) is run during the n-th session.

Referring to FIG. 7, at processing block 701, processing logic takes network measurements. Based on the network measurements, processing logic generates interval-averaged topology graphs $\{G_1, G_2, G_3, \ldots G_n\}$. During the n-th session, processing logic forms a virtual topology for each service class. In one embodiment, in constructing the virtual topology, it is assumed that a QoS-based topology control mechanism is present, providing the sets of nodes, links, and link bandwidths that are to be used by each service class of the multicast communication. The topology control mechanism can be a routine in the routing layer. Alternatively, since network coding does not need to discover or maintain path or route information, the topology control mechanism can be a completely new module replacing the traditional routing algorithm. In generating the virtual topology it is assumed that the set of instantaneous topologies during all the past sessions have been obtained via link-state measurements and are hence available. Specifically, at the outset of the n-th session, the collection of weighted (time-averaged) topology graphs G(V,E,C(k)), for k<n, are available, where:

a) V denotes the vertex set representing the communication nodes;

b) $E=\{e_1, e_2, e_3, \ldots, e_{|E|}\}$ is a set of directed edges, where the i-th edge ($e_i$) is a link or set of interfaces interconnecting a pair of vertices ($\alpha$, $\beta$), where node $\alpha$ is the tail of the edge ($a$=tail($e_i$)) and node $\beta$ is the head of the edge ($\beta$=head($e_i$));

c) C(k) denotes the capacity, or throughput vector associated with the edge set during the k-th session.

Figure 8:
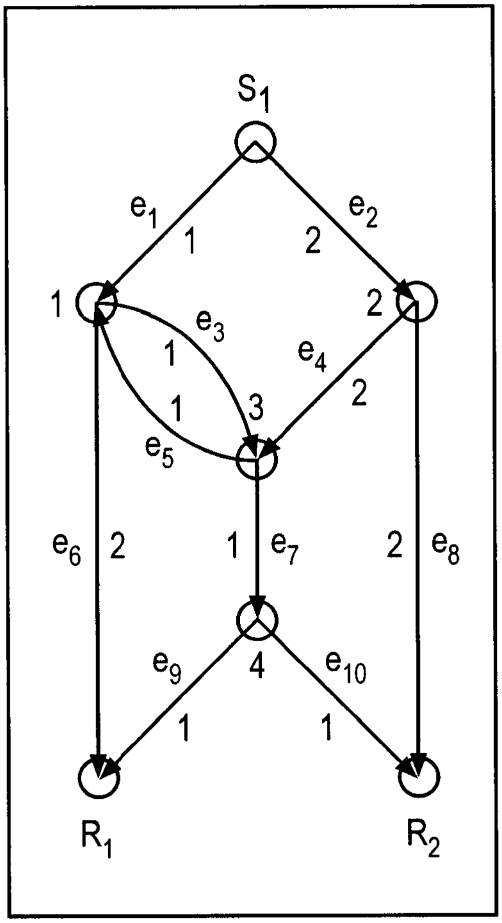
FIG. 8 illustrates a virtual graph for the time-varying topology in FIG. 6 with labeled edges.

FIG. 8 illustrates a virtual graph for the time-varying topology in FIG. 6 with labeled edges. Referring to FIG. 8, a weighted topology graph at, say, session k is shown in which $V=\{S_1, R_1, R_2, 1, 2, 3, 4\}$ and $E=\{e_1, e_2, e_3, e_4, e_5, e_6, e_7, e_8, e_9, e_{10}\}$. For instance, in the graph, $S_1$=tail($e_1$) and 1=head ($e_1$). Likewise, $R_2$=head($e_8$)=head($e_{10}$) and 4=tail($e_9$)=tail ($e_{10}$). The throughput (weight) vector associated with E at the k-th session is C(k)={1, 2, 1, 2, 1, 2, 1, 2, 1, 1}.

In general, $c_i(k)$ representing the i-th element of C(k) (and denoting the capacity, or throughput value estimate during the k-th session over edge $e_i$, i.e., the i-th edge of the topology graph) changes over time, although it remains bounded. The link-state measurement function tracks C(n) over time; at the outset of the n-th session, it uses knowledge of C(k) for k<n, to form a predicted (virtual) topology for each service class during the n-th session. Specifically, the virtual topology graph for service class j can be expressed as $VG_j(n)=G(V,E,C_j(n))$, where the l-th entry of $C_j(n)$ is the allocation over the predicted capacity of the l-th link during the n-th session for service class j. In general, not all the vectors {C(k), k<n} need to be used in calculating $C_j(n)$, and therefore, $VG_j(n)$.

The throughput vector of the virtual topology graph is an estimate of the time-averaged link-capacities to be observed in the n-th session. In one embodiment, the computation of the estimate $C_j(n)$ takes into account other factors in addition to all C(k), for k<n. For instance, it can take into account any available statistical characterization of the throughput vector process, past virtual graphs that were used, accuracy of past-session $C_j$ estimates, and, potentially, the size of the virtual buffers that are discussed below, including their occupancy. Furthermore, it may take into account finer information about the variability of the link capacities during any of the past sessions. Letting C(k,r) denote the r-th vector of link capacity measurement that was obtained during the k-th session, and assuming $\tau_k$ such vectors are collected during the k-th session (i.e., in $T_k$ units of time), the capacity vector of the j-th virtual topology, $C_j(n)$, can be calculated in general by directly exploiting the sets $\{C(k,1), C(k,2), \ldots, C(k,\tau_k)\}$, for all k<n. Note that the i-th entry of C(k,r), denoting the capacity measurement for the i-th link in the r-th measurement vector of the k-th session, may be empty, signifying that "no measurement of that entry/link is available at this sampling point."

In one embodiment, the virtual topology is computed in a centralized manner by collecting the link-state measurement data at a central location where the virtual topology is to be calculated. The central location may be the source of the multicast flow or ingress router of the routing domain. Alternatively, the central location can be an overlaid signaling/control topology as well. Alternatively, in another embodiment, a distributed link-state measurement is required and a signaling mechanism exists. Here, assuming each node runs the same prediction algorithm, one can guarantee that each node can share the same view on the topology and the predicted averages over the new session, provided sufficient time is allowed for changes to be propagated and take effect. Finally, the available link-state measurements can also be exploited by the topology control module, in order to expand or prune the vertex set V and/or the edge set E depending on the attainable network capacity.

Referring back to FIG. 7, once a virtual topology graph $G(V, E, C_j(n))$ is chosen for the j-th service class during the n-th session, processing logic constructs a network code for each virtual topology graph VG(n). The computation of each function can be centralized or distributed. The network codes can be selected to be throughput maximizing or not. There are many existing techniques that can design deterministic or random (pseudo-random in practice) linear network codes that achieve the maximum-flow (minimum-cut) capacity over a given fixed graph. It is assumed that one such linear network code is chosen based on one of the existing methods for designing throughput-maximizing network codes for such fixed network graphs. One such method is described in Jaggi et al., "Polynomial time algorithms for multicast network code construction", IEEE Trans. On Information Theory, Vol. 51, No. 6, pp. 1973-1982, June 2005. Such a network code can be expressed via |E| vector-input vector-output functions $\{f_{1,j}, f_{2,j}, \ldots, f_{|E|,j}\}$ (one function per edge per class in the graph). Specifically, the network code function $f_{i,j}$, associated with edge $e_i$ for service class j, outputs a vector of encoded packets $y_{i,j}$ of dimension $c_{i,j}(n)$, where $c_{i,j}(n)$ is the i-th element of $C_j(n)$. Let k=tail($e_i$) denote the tail of edge $e_i$, and let $V_k$ denote the subset of indices from {1, 2, . . . , |E|} such that the associated edges in E have node k as their head node. Also, let $Y_{k,j}$ denote the vector formed by concatenating all vectors $y_{m,j}$ for all m in $V_k$ (denoting all the vectors of encoded packets arriving to node k through all its incoming edges), and let $c_{k,j}^*(n)$ denote its dimension. Then, the vector of encoded packets that is to be transmitted over edge $e_i$ out of node k for service class j is formed as follows $$y_{i,j}=f_{i,j}(Y_{k,j})=W_{i,j}Y_{k,j}, \quad (1)$$

where the scalar summation and multiplication operations in the above matrix multiplication are performed over a finite field, and $W_{i,j}$ is a matrix of dimension $c_{i,j}(n)\times c_{k,j}^*(n)$ with elements from the same field. Although not stated explicitly in the functional descriptions of $W_{i,j}$, $y_{i,j}$, and $Y_{k,j}$, in general, their dimensions depend not only on the edge index i, but also on the session index n.

Note that, in general, the edge capacities of a virtual graph may not be integers. In that case, each edge capacity $c_{i,j}(n)$ is scaled by a common factor t(n) and rounded down to the nearest integer, denoted by $Q_{i,j}^*(n)$. The network code outputs on edge $e_i$ a vector $y_{i,j}$ of dimension $Q_{i,j}^*(n)$. Similarly, the dimensions of $W_{i,j}$ are $Q_{i,j}^*(n)\times c_{k,j}^*(n)$, where $c_{k,j}^*(n)$ is the dimension of $Y_{k,j}$ (denoting the vector formed by concatenating all vectors $y_{m,j}$ for all m in $V_k$). Also, in practice, each packet consists of several symbols, where each symbol consists of a finite set of bits. The number of bits in a symbol is defined as the base-2 logarithm of the order of the finite field over which the linear combinations are formed. The linear combinations are applied on a symbol-by-symbol basis within each packet.

In an alternative embodiment, the minimum cut capacity is achieved using a network code that does not utilize all the available capacity of each edge.

After computing the network codes, processing logic constructs a virtual buffer system for implementing each network code over the physical time-varying topologies during the n-th interval (processing block 705).

Finally, in one embodiment, associated with each receiver is a linear vector-input vector-valued linear function that takes all the available packets at the incoming virtual interfaces for each service class and recovers the original packets. Each of these decoding operations corresponds to solving a set of linear equations based on the packets received from all the incoming edges at the receiving node. Note that intermediate nodes, i.e., nodes that are not final receivers of information, can also perform such decoding operations in calculating messages for their outgoing interfaces.

As known in the related art, by properly selecting the size of the finite field and the set of coefficients used in the linear network-coding transformations over a fixed graph, one can attain the maximum achievable multicast throughput over a fixed graph. In one such example, one can select the coefficients randomly at the start of each time-interval and use them until the next interval where the virtual graph will change and, with high probability, the resulting network code will be throughput maximizing over the fixed graph. Network codes may be designed in a deterministic (and centralized) fashion over a given fixed virtual graph using specific algorithms, so that, in addition to achieving the maximum throughput, the code provides low decoding delay and decoding complexity.

For example, one such algorithm is described in Jaggi, et al., "Polynomial time algorithms for multicast network code construction", IEEE Trans. On Information Theory, Vol. 51, No. 6, pp. 1973-1982, June 2005.

In one embodiment, the network coding function is calculated based on a virtual topology graph $G(V, E, C_j(n))$ for each service class. This network coding function works effectively over the actual time varying networks. In one embodiment, the use of the network code that was designed for the virtual graph relies on emulation of the virtual graph over the instantaneous physical graphs that arise in the network over time. Such emulation accommodates the fact that the sequence of physical topologies observed can, in general, be significantly different from the union of the individual-class virtual topologies that was assumed in designing the network coding functions $f_{1,j}, f_{2,j}, \ldots, f_{|E|,j}$.

In one embodiment, emulation of the set of virtual subgraphs over the instantaneous physical graphs is accomplished by exploiting a virtual buffering system with respect to the $f_{i,j}$'s. In one embodiment, the virtual buffer system consists of virtual input and virtual output buffers with hold/release mechanisms, designed with respect to the virtual-graph network code. Note that the operation of these buffers is more elaborate than simply locally smoothing out local variations in link capacities, especially when alternating between various extreme topologies. In one embodiment, it allows optimizing the choice of the network codes used on the virtual graphs in an effort to: (i) achieve high throughput over the allocated resources for each service class at low decoding complexity and low delay; (ii) provide service (decoding delay) differentiation for different service classes by providing different levels of local variation-smoothing to network coded data of different classes.

Figure 9:
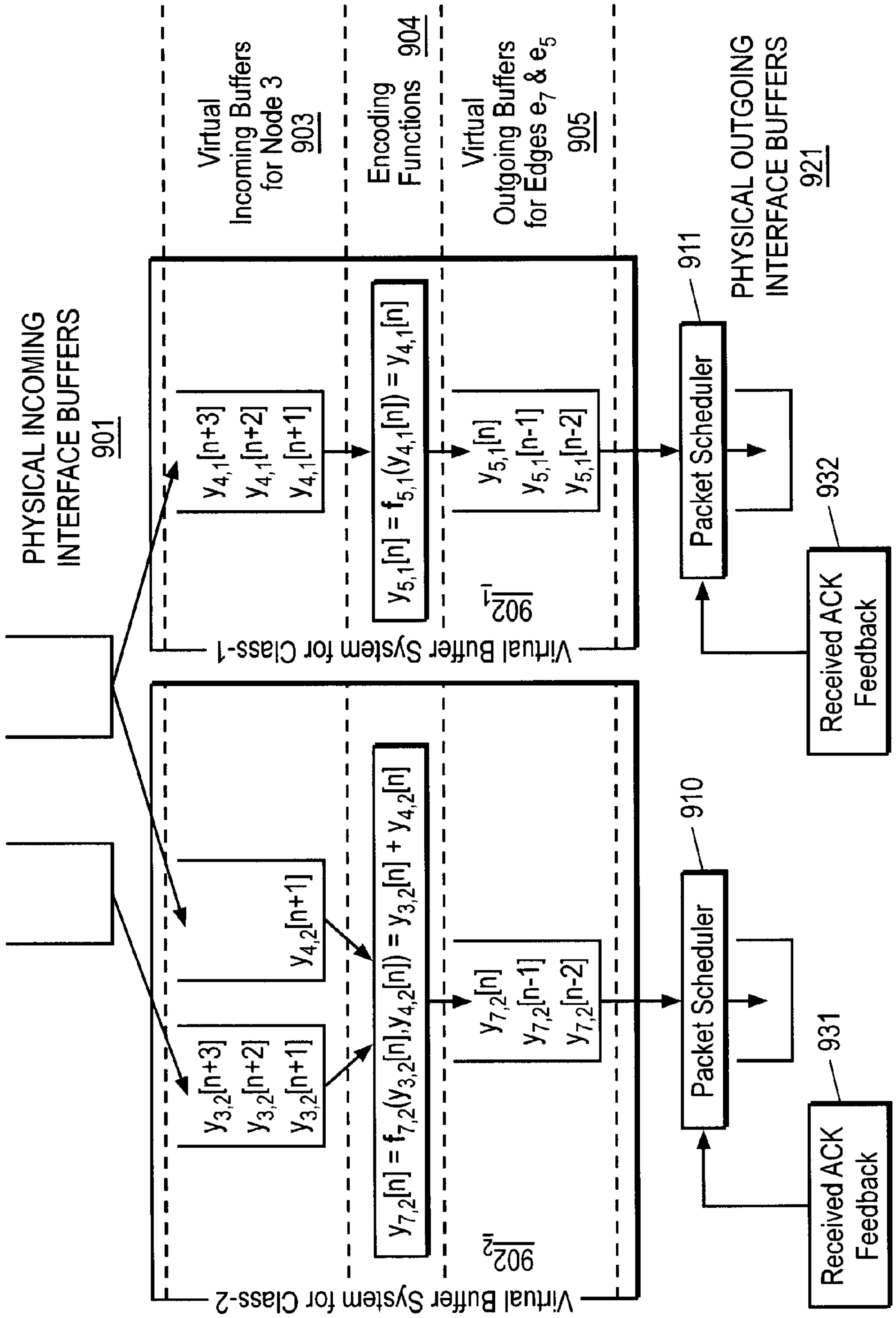
FIG. 9 is a block diagram of one embodiment of a node architecture with virtual buffers and network coding functions for each service class at a given node.

FIG. 9 is a block diagram of one embodiment of a node architecture with virtual buffers and network coding functions for each service class at a given node. The network code and buffer systems are shown with respect to the virtual graph decomposition shown in FIG. 6 at node 3 for the case of alternating topology graphs G1 and G2 with labeled edges correspond to those in FIG. 8. The decomposition shown in FIG. 9 considers two service classes, although, in general, more service classes can be considered. Each virtual graph (and, hence, each service class) dictates a set of local node functions, which must be accompanied by a virtual buffer system.

In one embodiment, packets are classified with respect to their service class. This may be done by examining the flow identifier (ID) that accompanies the data when it is received by physical incoming interface buffers 901. Upon reception from the physical interface buffers 901, the incoming data are put into the correct set of virtual incoming buffers 903. Encoding function 904 to be used for each service class, as well as the service class of the packet, jointly determine which packet should be placed on which virtual incoming buffer. FIG. 9 shows one encoding function for each service class (i.e., one outgoing edge for each class at node 3), though in general there can be a plurality of local functions. Once the packets are classified, QoS classes are isolated from each other and go through non-interfering virtual buffer and network coding systems, namely virtual buffer system $\mathbf{902}_2$ for class-2 and virtual buffer system $\mathbf{902}_1$ for class-1.

Each of virtual buffer system $\mathbf{902}_2$ for class-2 and virtual buffer system $\mathbf{902}_1$ for class-1 includes virtual incoming buffers for node 3, encoding functions 904 that apply the assigned network code to data queued in the virtual incoming buffers 903, and virtual output buffers 905 to receive the encoded data generated by encoding functions 904. The virtual outgoing buffers 905 may represent buffers for edges $e_7$ and $e_5$ of FIG. 8.

In one embodiment, the virtual buffers and the network codes may be implemented according to those described in U.S. Application No. 60/829,839, filed on Oct. 17, 2006, entitled "A Method and Apparatus for Efficient Information Delivery Over Time-varying Network Topologies," Kozat, et al., incorporated herein by reference.

The outputs of local network coding functions are then placed on the virtual outgoing buffers 905 associated with the outgoing interfaces (physical outgoing interface buffers 921). A QoS-based packet scheduler, such as packet scheduler 910 for the virtual buffer system for class-2 ($\mathbf{902}_2$) or packet scheduler 911 for virtual buffer system for class-1 ($\mathbf{902}_1$), then pulls the packets from the virtual outgoing buffers 905 and places them onto the physical outgoing interface buffer 921.

In one embodiment, packet schedulers 910 and 911 perform this function in response to received acknowledgement (ACK) feedback 931 and 932, respectively. ACK feedback 931 and 932 comprises information that is fed back from the receiving link on the given interface upon successful reception of the package.

Although FIG. 9 has been described in conjunction with encoding, embodiments of the node also perform decoding functions to decode incoming data that has been encoded by other nodes or at other locations. These decoding functions would reverse the network coding operation to recover the data. Such data may be further encoded by the node and output by the node in encoded form or output from the node as decoded data.

FIG. 10 illustrates an example of splitting capacity on a link into two subsets. Referring to FIG. 10, C1 is the capacity allocated to Class 1 (i.e., the capacity that is achievable over one slot and within any slot for Class 1), and C2 is the capacity allocated to Class 2. C3 is the capacity achievable over 2 slots of time, and it varies over time. The capacity C2 is equal to C3-C1 and represents that capacity which is achievable only over a duration of two consecutive slots.

Figure 11:
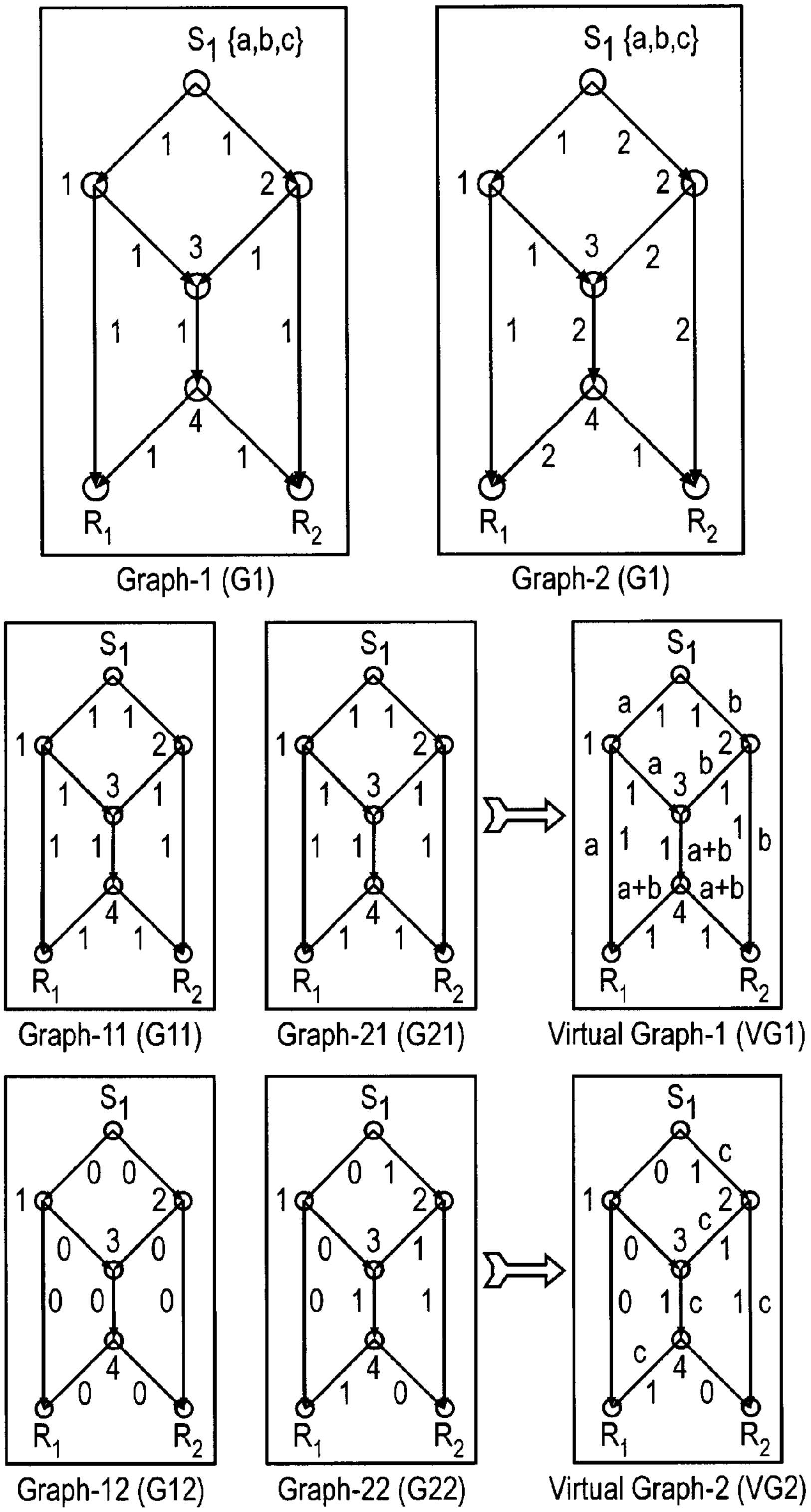
FIG. 11 illustrates an example of how a sequence of graphs can be decomposed into different sequences for each service class and how virtual graphs are formed for each sequence.

FIG. 11 illustrates an example of how a sequence of graphs can be decomposed into different sequences for each service class. Referring to FIG. 11, starting with a physical topology consisting of an alternating sequence of topologies, namely graphs G1 and G2, virtual graphs are computed for each sequence (i.e., service class) separately and one network code is designed per virtual graph (i.e., service class). More specifically, instead of starting from a base virtual graph representative of the actual sequence of topologies, at each epoch, the time-averaged graph of that epoch can be decomposed into a collection of graphs. For example, graph G1 is decomposed into G11 and G12 and graph G2 is decomposed into G21 and G22. Each graph in the collection is then associated with a particular service class and the union of the graphs become equivalent to the time-averaged graph of that epoch. In a sense, a resource allocation is made over the whole topology for each service class at each epoch that conforms to the QoS constraints of that service class. The result is a distinct sequence of topologies for each service class that can be used to compute a virtual graph per class directly from the corresponding sequence of topologies. In FIG. 11, the alternating sequence between G11 and G21 is used to form a virtual graph VG1 for a first class, while the alternating sequence G12 and G22 is used to form a virtual graph VG2 for the second class.

Once a virtual graph per class is constructed, the network code construction and virtual buffer implementation follows.

For instance in FIG. 10, the first virtual graph VG1 can be used for a QoS class that requires stable resources with short-term bandwidth and/or delay guarantees and VG2 can be used for best effort traffic which makes more bursty use of the available network resources.

Advantages of Embodiments of the Invention

Embodiments of the present invention provide implementation- and resource-efficient techniques for realizing the benefits of network coding (in terms of achieving maximum flow capacity between a set of senders and a set of receivers) over time-varying network topologies with service differentiation. In one embodiment, a fixed collection of network codes are systematically selected and implemented over a session, during which the network topology is time-varying. In one embodiment, each network code in the collection is custom designed with respect to a virtual topology suitable for a particular service class.

In one embodiment, assuming J service classes the network codes are designed as follows:

1. For each epoch (given time duration), a sequence of topologies (over time) is mapped to a set of individual-class virtual (graph) topologies $G(V,E, C_j(n))$ for $j=1, \ldots, J$.
2. Each virtual topology is used with existing fixed-topology methods to define a good network code for each service class.
3. The network code for a given service class is effectively implemented over the time-varying graph with the help of virtual buffers defined by the network code and a QoS-based scheduler.

Under a wide range of conditions, the proposed techniques attain optimal or near-optimal multicast throughput in the long-term while satisfying the quality of service requirements of individual packets in a multicast session or across many multicast sessions. Techniques described herein generalize the end-to-end quality of service provisioning by presenting a topology decomposition and network coding based solution. Embodiments of the invention do not compete with the existing QoS policies that are present at the schedulers and network ingress points; on the contrary, they make use of such implementations (see FIG. 9 and accompanying text above). Embodiments of the invention insert a network coding sublayer that takes the fluctuations of the network topology over time into account.

An Example of a Computer System

Figure 12:
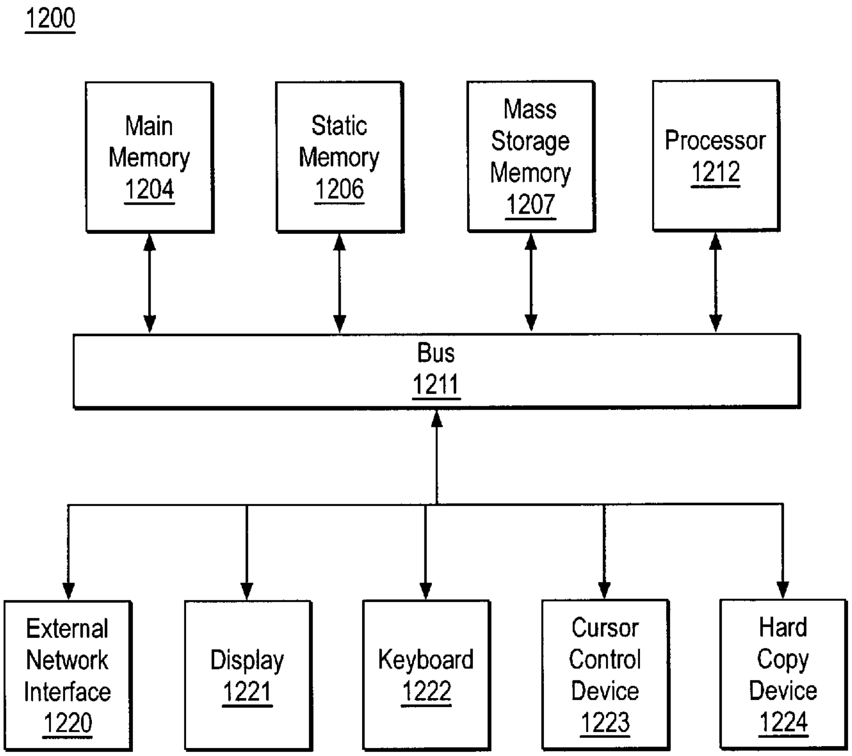
FIG. 12 is a block diagram of an example of a computer system.

FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, Alpha™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

decomposing a sequence of topology graphs that model a time-varying network topology into a plurality of virtual graphs, where each virtual graph of the plurality of virtual graphs corresponds to a distinct traffic class, the virtual topology graph representing a partial topology of a time-varying network;

selecting a network code for each virtual graph in the plurality of the virtual graphs to meet requirements of the distinct traffic class corresponding to said each topology graph, where the network code comprises a mathematical operation that is applied to incoming packets of its corresponding traffic class to encode packets of the associated traffic class, wherein the mathematical operation for the network code for at least one distinct traffic class comprises an operation performed jointly on a plurality of packets of the at least one distinct traffic class;

processing packets of each traffic class using the network code determined by its corresponding virtual topology and the requirements of said each traffic class, including using a virtual buffer system to implement the network code corresponding to each traffic class over the time-varying network topology by applying the mathematical operation of the network code associated with said each class to incoming packets of a corresponding traffic class at a network node to transform the incoming packet data into encoded packet data associated with each class and placing the encoded packet data into virtual output buffers associated with said each class at an outgoing physical interface of the network node; and using a scheduler to determine the transmission schedules for each output packet from the virtual buffer system of each traffic class through the outgoing physical interface, where scheduling decisions are based, at least in part, on the QoS requirements of each class.

2. The method defined in claim 1 wherein selecting a network code comprises constructing the network code for each virtual graph in the plurality of virtual graphs.

3. The method defined in claim 1 wherein the plurality of virtual graphs comprises a plurality of parallel sequences of topologies, the union of which models the time-varying network topology.

4. The method defined in claim 1 wherein each of the distinct classes comprises a distinct QoS class.

5. The method defined in claim 4 wherein a one-to-one correspondence exists between each QoS class and a network code used for the QoS class.

6. The method defined in claim 4 wherein processing packets of each traffic class using the network code comprises encoding packets for each QoS class separately at each network node and placing encoded packet data associated with said each QoS class generated at said each network node into respective priority queues at an outgoing physical interface of said each network node.

7. The method defined in claim 1 wherein each network code selected determines an intra-class buffering system and topology decomposition determines the inter-class scheduling.

8. A communication network system having a plurality of senders and a plurality of receivers in which information to be delivered from the senders to the receivers comprises information blocks of different classes, the network comprising:

a plurality of intermediate nodes to process and relay information between the senders and receivers, the plurality of nodes arranged in a time-varying network topology that is subject to change dynamically during use, wherein each node classifies incoming data according to traffic class, encodes the incoming data for each traffic class separately to transform the incoming data into encoded packet data associated with each class by applying a mathematical operation of a network code assigned based on meeting requirements of the traffic class corresponding to a sub-virtual network topology graph of a virtual topology graph representing a topology of the dynamically changeable network decomposed into a plurality of distinct topology sequences, wherein the mathematical operation of the network code for at least one distinct traffic class comprises an operation performed jointly on a plurality of packets of the at least one distinct traffic class, stores the encoded packet data into virtual output buffers of a virtual buffer system, each of the virtual output buffers being associated with one traffic class, and sends encoded data from the virtual output buffers through an outgoing physical interface of the network node to one or more other nodes in the network topology, according to traffic class, when transmission opportunities are available.

9. The communication network system defined in claim 8 wherein said each node stores encoded data in queues at an outgoing physical interface for subsequent transmission, each of the queues being assigned to a distinct traffic class.

10. The communication network defined in claim 8 wherein the network topology dynamically changes due to failure or availability of one or more network elements in the network, additions of one or more new network elements into the network, or variations in one or more existing network elements in the network in one or more of bandwidth, capacity and connectivity.

11. The communication network defined in claim 8 wherein the information block of different classes comprises information blocks of different priority or different quality of service.

12. The communication network system defined in claim 8 wherein at least one of the plurality of nodes comprises:

a physical incoming interface;

a virtual buffer system to buffer incoming data and apply a network code to the incoming data based on traffic class;

a scheduler coupled to the virtual buffer system to cause codes generated by the virtual buffer system to be output; and a physical outgoing interface coupled to the virtual buffer system and the scheduler to output codes generated by the virtual buffer system under control of the scheduler that is constrained by each virtual graph corresponding to a distinct QoS class.

13. The communication network system defined in claim 8 wherein at least one node of the plurality of nodes classifies the incoming data with respect to quality of service requirements, performs encoding operations on the incoming data of different classes using a network code assigned to each of the different classes, and monitors observed local interface capacities and statistics of encoded blocks served by the local interface to schedule the sending of encoded data blocks.

14. The communication network system defined in claim 13 wherein at least one node changes an encoding function to apply to data of one traffic class in response to a message received specifying the change.

15. The communication network system defined in claim 13 wherein at least one node computes an encoding function for at least one service class based on a received set of network measurements.

16. The communication network system defined in claim 13 wherein at least one node comprises a virtual buffer system for each class to perform at least one of the encoding and decoding functions.

17. The communication network system defined in claim 16 where the encoding and decoding functions are computed with respect to a virtual graph for the service class to which the encoding and decoding functions belong.

18. The communication network system defined in claim 16 wherein the virtual buffer system includes at least one buffer and function unit shared across different service classes.

19. The communication network system defined in claim 16 wherein the virtual buffer system includes separate buffer and function unit for each different service class.

20. The communication network system defined in claim 8 wherein the virtual topology graph is computed by computing a common virtual graph given history of observed topology graphs and decomposing the virtual graph into a collection of virtual sub-graphs using the service requirements of different service classes and topology statistics.

21. The communication network system defined in claim 8 wherein the virtual topology graph is computed by:

decomposing a sequence of observed topologies into separate sequences of topologies, each separate sequences of topologies being for a unique service class;

conserving total resources used by all the service classes at each observation interval;

using quality of service requirements of each service class and the topology statistics in decomposition; and forming a virtual graph for each sequence using the topology statistics of said each sequence.

22. The communication network system defined in claim 8 wherein the virtual topology graph is computed using averages of at least one of long term link capacity and bandwidth and higher order statistics.

23. A network node comprising:

a physical incoming interface;

a virtual buffer system to buffer incoming data and apply a network code to the incoming data based on traffic class and based on meeting requirements of the traffic class, where the network code comprises a mathematical operation that the virtual buffer system applies to incoming data to transform the incoming packet data into encoded packet data associated with each class, the virtual buffer system being operable to place the encoded packet data into virtual output buffers associated with said each class, wherein the mathematical operation for the network code for at least one distinct traffic class comprises an operation performed jointly on a plurality of packets of the one traffic class;

a scheduler coupled to the virtual buffer system to cause codes generated by the virtual buffer system to be output, wherein the scheduler allocates one or more of short-term and long-term bandwidth and short-term and long-term rate based on a virtual graph associated with a given virtual output buffer; and a physical outgoing interface coupled to the virtual buffer system and the scheduler to output codes generated by the virtual buffer system and stored in the virtual output buffers under control of the scheduler.

24. The network node defined in claim 23 wherein the encoding function used for each service class and the service class of the packet jointly determine which packet to place on which virtual incoming buffer.

25. The network node defined in claim 23 wherein the virtual buffer system comprises:

buffers to buffer input packets upon arrival and output packets for transmission;

an encoding unit to employ encoding functions to map input packets to output packets on outgoing physical interfaces;

a scheduler to determine buffering time of input packets and the associated number of output packets generated at each node.

26. A method to perform virtual topology based service provisioning and service differentiation in a network having a time-varying network topology, the method comprising:

decoupling a fixed virtual network graph representing the time-varying topology into two or more virtual topologies, each of the two or more virtual topologies being associated with a different traffic class;

assigning a network code to each of the two or more virtual topologies based on quality of service (QoS) provisioning;

processing, at a network node, incoming data by differentiating flows with respect to their priority levels, their associated network coding functions and corresponding routes, including encoding the incoming data for each traffic class separately to transform the incoming data into encoded packet data associated with each class by applying a mathematical operation associated with the network code assigned to and associated with each of the two or more virtual topologies based on quality of service (QoS) provisioning, wherein the mathematical operation for the network code for at least one distinct traffic class comprises an operation performed jointly on a plurality of packets of the at least one distinct traffic class.

27. The method defined in claim 26 wherein each traffic class is a QoS class and is encoded separately, with results of the encodings of each class being placed into their respective priority queues at an outgoing physical interface of a node.

28. The method defined in claim 1 wherein the mathematical operation comprises linear combinations on Galois bit fields.

29. The communication network system defined in claim 8 wherein the mathematical operation comprises linear combinations on Galois bit fields.

30. The network node defined in claim 23 wherein the mathematical operation comprises linear combinations on Galois bit fields.

31. The method defined in claim 26 wherein the mathematical operation comprises linear combinations on Galois bit fields.

32. The method defined in claim 1 wherein the mathematical operation comprises a bit-wise XOR operation.

33. The communication network system defined in claim 8 wherein the mathematical operation comprises a bit-wise XOR operation.

34. The network node defined in claim 23 wherein the mathematical operation comprises a bit-wise XOR operation.

35. The method defined in claim 26 wherein the mathematical operation comprises a bit-wise XOR operation.

* * * * *